US008634868B2

(12) United States Patent
Hedberg et al.

(10) Patent No.: US 8,634,868 B2
(45) Date of Patent: Jan. 21, 2014

(54) UPLINK SELECTION USING SOUNDING REFERENCE SIGNALS IN RADIOCOMMUNICATION SYSTEMS

(75) Inventors: Tomas Hedberg, Stockholm (SE); Tomas Nylander, Värmdö (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 56 days.

(21) Appl. No.: 13/132,467

(22) PCT Filed: May 23, 2011

(86) PCT No.: PCT/SE2011/050638
§ 371 (c)(1),
(2), (4) Date: Sep. 15, 2011

(87) PCT Pub. No.: WO2012/108802
PCT Pub. Date: Aug. 16, 2012

(65) Prior Publication Data
US 2012/0202558 A1    Aug. 9, 2012

Related U.S. Application Data

(60) Provisional application No. 61/440,241, filed on Feb. 7, 2011.

(51) Int. Cl.
*H04M 1/00*    (2006.01)
(52) U.S. Cl.
USPC ..................... 455/550.1; 455/501; 455/525
(58) Field of Classification Search
USPC ....................... 455/550.1, 501, 525
See application file for complete search history.

(56) References Cited

U.S. PATENT DOCUMENTS

| | | | |
|---|---|---|---|
| 2009/0046645 A1* | 2/2009 | Bertrand et al. | 370/329 |
| 2010/0041410 A1 | 2/2010 | Englund et al. | |
| 2010/0135273 A1 | 6/2010 | Kim | |
| 2010/0142466 A1 | 6/2010 | Palanki | |
| 2010/0159935 A1* | 6/2010 | Cai et al. | 455/450 |
| 2010/0246561 A1* | 9/2010 | Shin et al. | 370/345 |
| 2010/0325226 A1* | 12/2010 | McBeath et al. | 709/206 |

(Continued)

FOREIGN PATENT DOCUMENTS

| | | |
|---|---|---|
| WO | 2009/025602 A1 | 2/2009 |
| WO | 2010/124241 A2 | 10/2010 |

OTHER PUBLICATIONS

Invitation to Pay Additional Fees for corresponding application PCT/SE2011/050638 mailed Sep. 2, 2011.

(Continued)

*Primary Examiner* — Barry Taylor
(74) *Attorney, Agent, or Firm* — Potomac Patent Group PLLC

(57) ABSTRACT

Systems and methods allow for uplink selection using sounding reference signals in radiocommunication systems. A method for selecting at least one antenna to receive uplink transmissions from a user equipment (UE) from among a plurality of antennas includes the steps of: assigning a sounding reference signal (SRS) resource to the UE, receiving one or more reports from antenna devices having said plurality of antennas, which reports indicate receipt of an SRS on said assigned SRS resource, and selecting the at least one antenna based on said one or more reports.

55 Claims, 18 Drawing Sheets

(56) References Cited

U.S. PATENT DOCUMENTS

| | | | |
|---|---|---|---|
| 2011/0098054 A1* | 4/2011 | Gorokhov et al. | 455/452.1 |
| 2011/0136484 A1* | 6/2011 | Braun et al. | 455/422.1 |
| 2011/0237266 A1* | 9/2011 | Cai | 455/450 |
| 2011/0294529 A1* | 12/2011 | Luo et al. | 455/509 |
| 2011/0310861 A1* | 12/2011 | Jia et al. | 370/336 |
| 2012/0071200 A1* | 3/2012 | Bienas et al. | 455/525 |
| 2012/0155291 A1* | 6/2012 | Koivisto et al. | 370/252 |
| 2012/0172041 A1* | 7/2012 | Krishnamurthy et al. | 455/436 |

OTHER PUBLICATIONS

International Search Report for corresponding application PCT/SE2011/050638 mailed Nov. 21, 2011.
Written Opinion for corresponding application PCT/SE2011/050638 mailed Nov. 21, 2011.
Sharp, "Necessity of Multi-Shot Dynamic Aperiodic SRS," R1-103726, 3GPP TSG RAN WG1 Meeting #61 bis, Dresden, Germany, Jun. 28-Jul. 2, 2010, pp. 1-6, XP050449157.
Samsung, "SRS Transmission in LTE-A," R1-094576, 3GPP TSG RAN WG1 #59, Jeju, Korea, Nov. 9,-13, 2009, pp. 1-3, XP050388990.
Texas Instruments, "Increasing Sounding Capacity for LTE-A," R1-100745, 3GPP TSG RAN WG1 #59bis, Valencia, Spain, Jan. 18-22, 2010, pp. 1-5, XP050418383.
Research in Motion, "Relay control signalling resource coordination," R1-090027, 3GPP TSG RAN WG1 Meeting #55-bis, Ljubljana, Solvenia, Jan. 12-16, 2009, pp. 1-3, XP002565975.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Technical Specification, 3GPP TS 36.300, v10.5.0, Sep. 2011, pp. 1-194.
Alcatel-Lucent, et al., "Way Forward on Aperiodic SRS Triggering," R1-110558, 3GPP TSG RAN WG1 Meeting #63bis, Dublin, Ireland, Jan. 17-21, 2011, pp. 1-7.
3GPP, "3rd Generation Partnership Project; Technical Specification Group Radio Access Network; Evolved Universal Terrestrial Radio Access (E-UTRA); Radio Resource Control (RRC); Protocol specification; (Release 10)," Technical Specification, 3GPP TS 36.331, v10.3.0, Sep. 2011, pp. 1-296.
3GPP, "3rd Generation Partnership Project; Technical Specification Group Radio Access Network; Evolved Universal Terrestrial Radio Access (E-UTRA); Physical Channels and Modulation (Release 10)," Technical Specification, 3GPP TS 36.211, v10.3.0, Sep. 2011, pp. 1-103.

* cited by examiner

UPLINK SELECTION USING SOUNDING REFERENCE SIGNALS IN RADIOCOMMUNICATION SYSTEMS

RELATED APPLICATION

The present application is related to, and claims priority from U.S. Provisional Patent Application No. 61/440,241, entitled "Uplink Selection Using Sounding Reference Signals In Radiocommunication Systems", filed on Feb. 7, 2011, to Tomas Hedberg et al., the disclosure of which is incorporated here by reference.

TECHNICAL FIELD

The present invention relates generally to telecommunications systems, and in particular, to methods, systems, devices and software for uplink selection using sounding reference signals in radiocommunication systems.

BACKGROUND

Radiocommunication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radiocommunication applications, while at the same time using legacy infrastructure, network operators could deploy hybrid networks wherein a next generation radiocommunication system is overlaid onto an existing circuit-switched or packet-switched network as a first step in the transition to an all IP-based network. Alternatively, a radiocommunication system can evolve from one generation to the next while still providing backward compatibility for legacy equipment.

One example of such an evolved network is based upon the Universal Mobile Telephone System (UMTS) which is an existing third generation (3G) radiocommunication system that is evolving into High Speed Packet Access (HSPA) technology. Yet another alternative is the introduction of a new air interface technology within the UMTS framework, e.g., the so-called Long Term Evolution (LTE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

Mobile networks are typically subdivided into cells, in order to re-use air interface resources (frequencies, time slots, codes) from area to area and thereby increase the total capacity. The need for capacity gain in next generation systems applies both in the uplink and downlink. Hence it is natural to define a cell as an object with both uplink and downlink transmission capabilities. An individual UE is typically served by the same cell in both up- and downlink. One exception to that rule is UTRAN using HSDPA and HSUPA. A UE can be supported by up to 6 cells simultaneously (active set for soft handover), but the HSUPA uplink may use a subset of those 6 cells. Furthermore, only one cell within the active set supports the HS-DSCH channel, i.e. the channel carrying user data. In all of these exception cases, i.e., where different cells can serve a UE on the uplink and downlink, the choice of uplink cell(s) serving a specific UE is a subset of the cell(s) serving the same UE in the downlink. The choice of uplink cells are furthermore based on downlink measurements.

The tight association between uplinks and downlinks in such systems requires planning, so that uplinks and downlinks have comparable coverage. As an example, consider that the UE selects the best cell to camp on in idle mode, based on downlink signal strength and quality. If the uplink for that UE would have less coverage, the UE may fail to establish communication, although it is mandated to stay in the best cell from a downlink perspective.

A cell is supported by Radio Base Station (RBS) equipment at a RBS site. The RBS typically has one set of uplink and downlink antennas, which are close to the RBS itself. Another deployment option is a Distributed Antenna System (DAS), where a number of smaller antennas are distributed in a building. Yet another option is "leaking cable", where the antenna is effectively distributed over several 100 meters. Nevertheless, in the above deployment scenarios, the antennas behave as one single antenna and there is no selection of uplink antennas separated from selection of downlink antennas.

In a cellular network there will always be areas with high traffic, i.e. a high concentration of users. In those areas it would be desirable to deploy additional capacity to maintain user satisfaction with the radiocommunication service. The added capacity could, e.g., be provided in the form of an additional macro base station or by deploying nodes with lower output power and thus covering a smaller area in order to concentrate the capacity boost on a smaller area. There will also be areas with bad coverage where there is a need for coverage extension, and again one way to do that is to deploy a node with low output power to concentrate the coverage boost in a small area.

One reason for choosing nodes with lower output power in the above cases is that the impact on the macro network can be minimized, e.g. it is a smaller area where the macro network may experience interference. Currently there is a strong drive in the industry in the direction towards the use of low power nodes. The different terms used to describe this type of network deployments include heterogeneous networks, sometimes called "HetNets" or multilayer networks. FIG. 1 illustrates a macro base station 100 which provides a wide area coverage (also called macro cell 102), and also lower power nodes that are deployed to provide small area capacity/coverage within the macro cell 102. For example, pico base stations 104, relays 106 and home base stations (femto cell clusters 108) are shown in FIG. 1 as examples of lower power nodes which can supplement the coverage provided by base station 100.

When the same carrier is used for macro- and pico-cells, the small cells are inherently "unbalanced" between downlink and uplink. In the uplink the macrocell and picocell are similar in sensitivity, so the best radio link is mainly determined by path loss towards macrocell and pico cell, respectively. In the downlink the transmit power difference, e.g., 20 W and 1 W, will decrease the area where the picocell link is better. This is illustrated in the FIG. 2, where 'RSRP border' 200 depicts the point of 'equal downlinks' and 'RSRP+offset' 202 depicts the point where uplink path loss is equal for macrocell 204 and picocell 206. UEs (not shown) located between the RSRP border 200 and the RSRP+offset border 202 will thus have different optimal uplink and downlink. There is a need to identify if a particular UE is in this border area, in order to allocate reception resources. If the pico cell 206 and the macrocell 204 have different physical identities (e.g. cell scrambling code in UTRAN or Physical Cell Id in E-UTRAN), then the UE could send measurement reports about the cells in the vicinity.

A more generalized situation is a network consisting of several uplink antennas and several downlink antennas. The uplink and downlink antennas need not be co-located. A specific cell may be supported by N uplink antennas and M downlink antennas. One reason for not allocating one cell per antenna could be planning issues, i.e. neighbor relations between cells need to be updated too frequently. Another reason may be degraded UE battery life, i.e. moving UEs need to perform cell updates more frequently. In the above cases there is a need to identify the best uplink to use, which may be different from the downlink.

A current solution in LTE for detecting a best uplink antenna is to configure separate cells (PCI) for each antenna, so that UE can identify the different downlinks. Then the UE is configured to monitor and report DL quality (RSRP and/or RSRQ) from different cells. Using that information, path loss is derived, e.g., based on DL TX powers antenna gains, etc. The best uplink antenna associated with the UE is then estimated based on antenna gains, and that antenna is activated for this UE (meaning that UE-specific processing for that antenna is started).

However, this solution has certain drawbacks including, for example, more difficult cell planning, more UE measurements means more UE power drain and more signaling over the air interface (thereby reducing bandwidth for other signaling).

Accordingly, it would be desirable to develop other methods, devices, systems and software for selecting an uplink antenna for a UE.

| ABBREVIATIONS/ACRONYMS | |
|---|---|
| C-RNTI | Cell Radio Network Temporary Identifier |
| eNB | Enhanced NodeB |
| LTE | Long term evolution |
| MIMO | Multiple-Input Multiple-Output |
| OFDM | Orthogonal Frequency Division Multiple Access |
| RRM | Radio Resource Management |
| SIB | System Information Block |
| SRS | Sounding Reference Signal |
| UE | User equipment |
| UASL | Uplink Antenna Selection Logic |
| UL | Uplink |
| DL | Downlink |
| PDCP | Packet Data Convergence Protocol |
| PDU | Protocol Data Unit |
| RLC | Radio Link Controller |
| MAC | Media Access Control |
| PHY | Physical |
| DRX | Discontinuous Reception |

SUMMARY

According to an embodiment, a method for selecting at least one antenna to receive uplink transmissions from a user equipment (UE) from among a plurality of antennas comprises the steps of: assigning a sounding reference signal (SRS) resource to the UE, receiving one or more reports from antenna devices indicating receipt of an SRS on said assigned SRS resource, and selecting the at least one antenna based on said one or more reports. The method can further include the step of: configuring the at least one antenna to receive said uplink transmissions from the UE.

According to another embodiment, a coordinator node is configured to select at least one antenna to receive uplink transmissions from a user equipment (UE) from among a plurality of antennas, wherein the coordinator node is configured to assign a sounding reference signal (SRS) resource to the UE, the coordinator node is configured to receive one or more reports from antenna devices having the plurality of antennas, which reports indicate receipt of an SRS on the assigned SRS resource, and the coordinator node is configured to select the at least one antenna based on said one or more reports.

BRIEF DESCRIPTION OF THE DRAWINGS

Embodiments of the present invention will now be described, by way of example only, with reference to the attached Figures, wherein.

DETAILED DESCRIPTION

The following detailed description of the exemplary embodiments refers to the accompanying drawings. The same reference numbers in different drawings identify the same or similar elements. Also, the following detailed description does not limit the invention. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

According to embodiments, UEs are assigned unique UL signatures in the area where uplink antenna selection is needed. Then, all antenna receivers, e.g., macro cell base stations, pico cell base stations, relays, etc., can search for the signatures. Information about the quality/strength of the signatures is sent to an uplink antenna selection logic (UASL). The UASL activates the best uplink antenna(s) (this may include more than one uplink antenna, e.g., if joint processing of received signals is used).

According to embodiments, the UL signatures used for uplink antenna selection can be Sounding Reference Signals (SRSs). The use of SRS across multiple cells and antennas is enabled by, for example, (a) exchange and coordination of used SRS opportunities per cell (timing, subcarriers, signal range) between adjacent cells, (b) assignment of a locally unique SRS per user, (c) per antenna listening for SRS transmitted from potential users coming close to that antenna (or leaving antenna) and (d) an interface to a coordinating point to activate and de-activate reception of user data (i.e. not only SRS) from a specific user in a specific antenna area. Embodiments include performing this logic in a multiple transmission point environment, e.g., mixed small and large cells and mixed small and large antenna areas. A macro RBS can contain the coordinator function, and coordination between different RBSs for uplink antenna selection of UEs can be provided.

Figure 1:
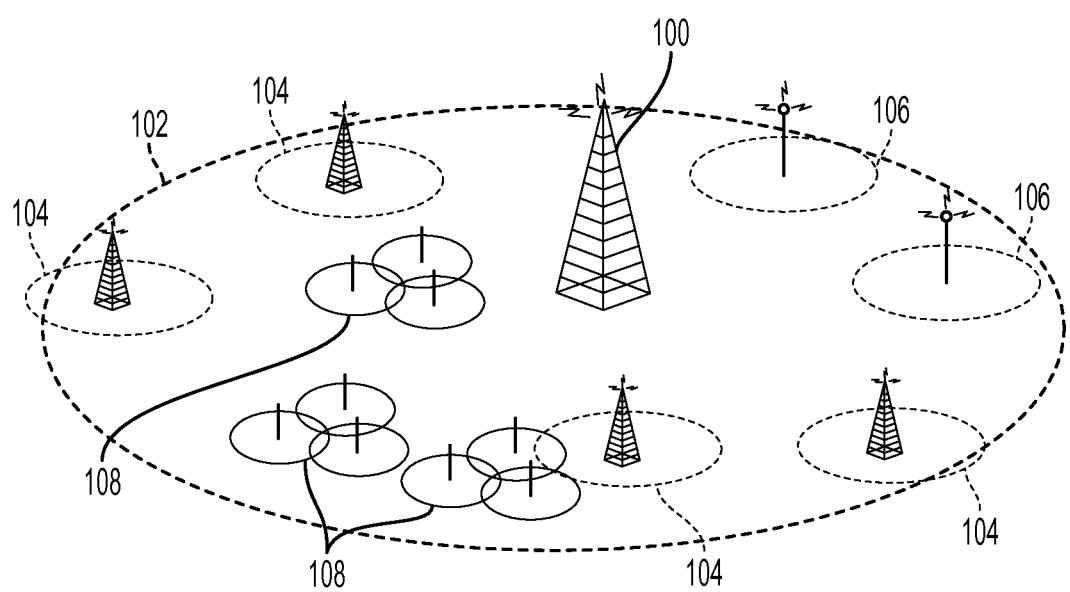
FIG. 1 illustrates a multi-point transmission architecture.
Figure 2:
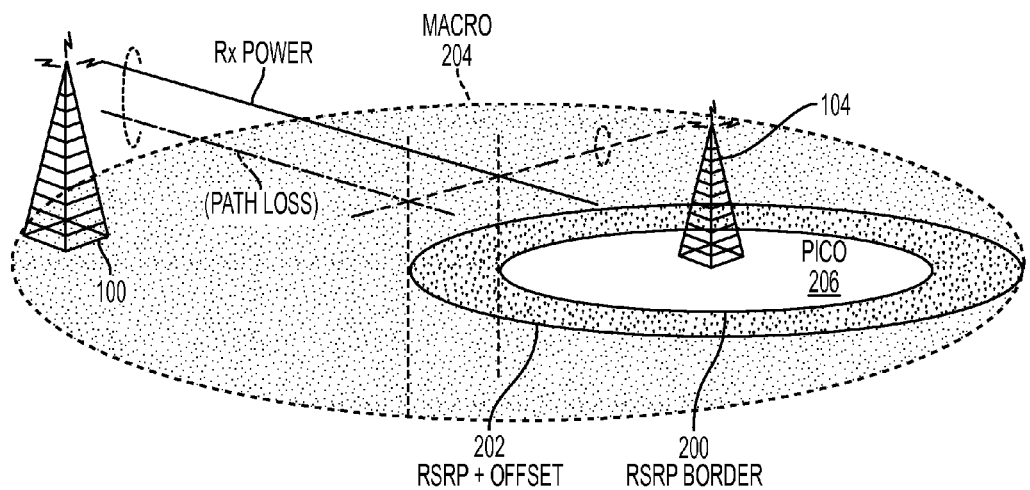
FIG. 2 illustrates cell range expansion of small cells.
Figure 3:
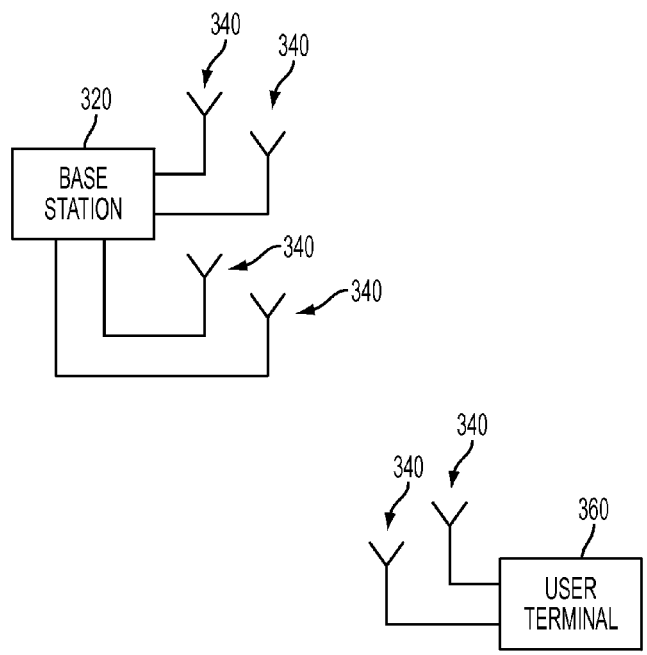
FIG. 3 illustrates a base station and a user terminal.
Figure 4:
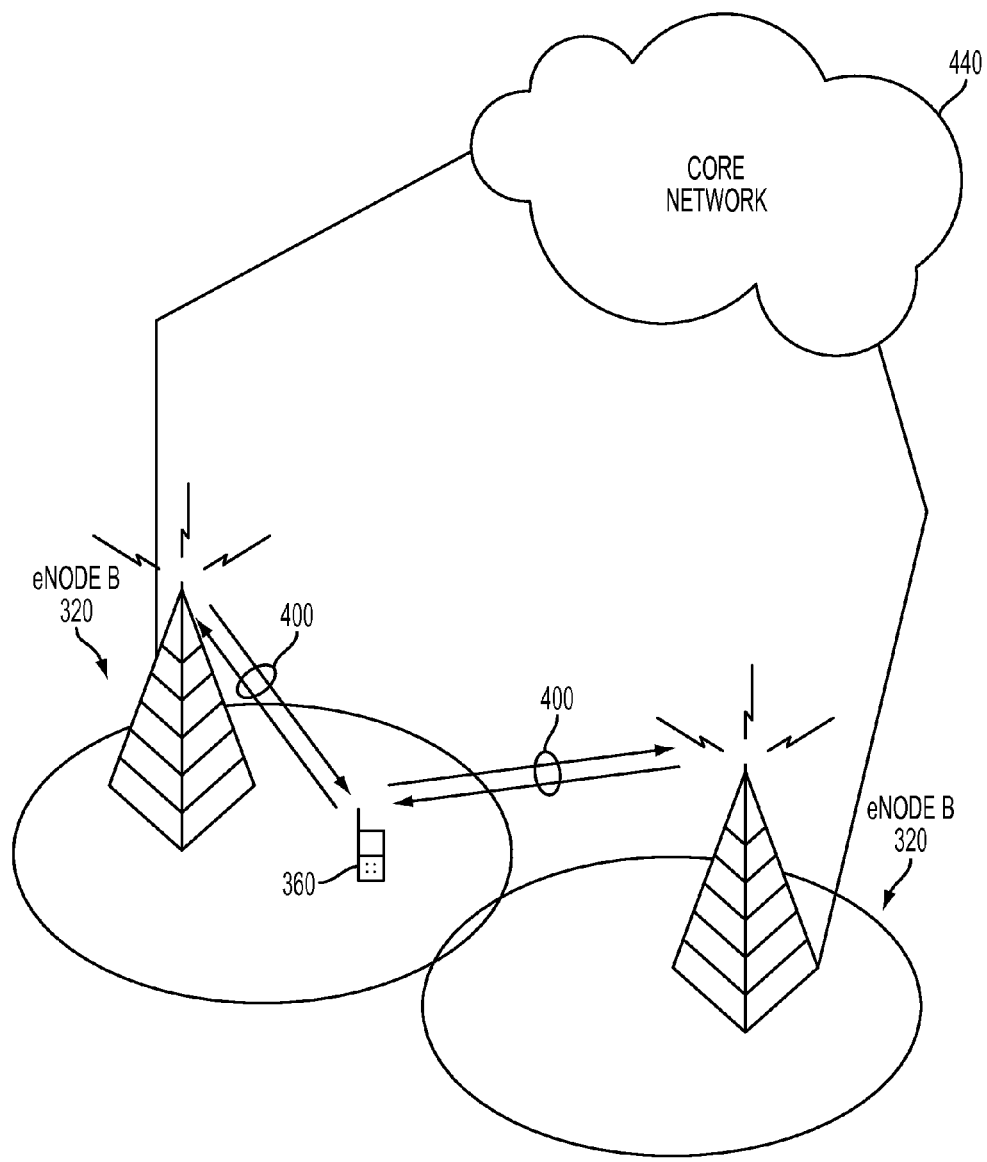
FIG. 4 depicts a communication system.

To provide some context for the following exemplary embodiments related to uplink antenna selection, consider the exemplary radiocommunication system as shown from two different perspectives in FIGS. 3 and 4, respectively. To increase the transmission rate of the systems, and to provide additional diversity against fading on the radio channels, modern wireless communication systems include transceivers that use multi-antennas—often referred to as MIMO systems. The multi-antennas may be distributed to the receiver side, to the transmitter side and/or provided at both sides as shown in FIG. 3. More specifically, FIG. 3 shows a base station 320, which could be a macro radio base station, pico base station, relay, etc., having four antennas 340 and a user terminal—also referred to herein as "user equipment" or "UE"—360 having two antennas 340. The number of antennas shown in FIG. 3 is exemplary and is not intended to limit the actual number of antennas used at the base station 320 or at the user terminal 360 in the exemplary embodiments to be discussed below.

Additionally, the term "base station" is used herein as a generic term. As will be appreciated by those skilled in the art, in the LTE architecture an evolved NodeB (eNodeB) may correspond to the base station, i.e., a base station is a possible implementation of the eNodeB. However, the term "eNodeB" is also broader in some senses than the conventional base station since the eNodeB refers, in general, to a logical node. The term "base station" is used herein as inclusive of a base station, a NodeB, an eNodeB or other nodes specific for other architectures. An eNodeB in an LTE system handles transmission and reception in one or several cells, as shown for example in FIG. 4.

FIG. 4 shows, among other things, two eNodeBs 320 and one user terminal or UE 360. The user terminal 360 uses dedicated channels 40 to communicate with the eNodeB(s) 320, e.g., by transmitting or receiving RLC PDU segments as described below. The two eNodeBs 320 are connected to a Core Network 440.

Figure 5:
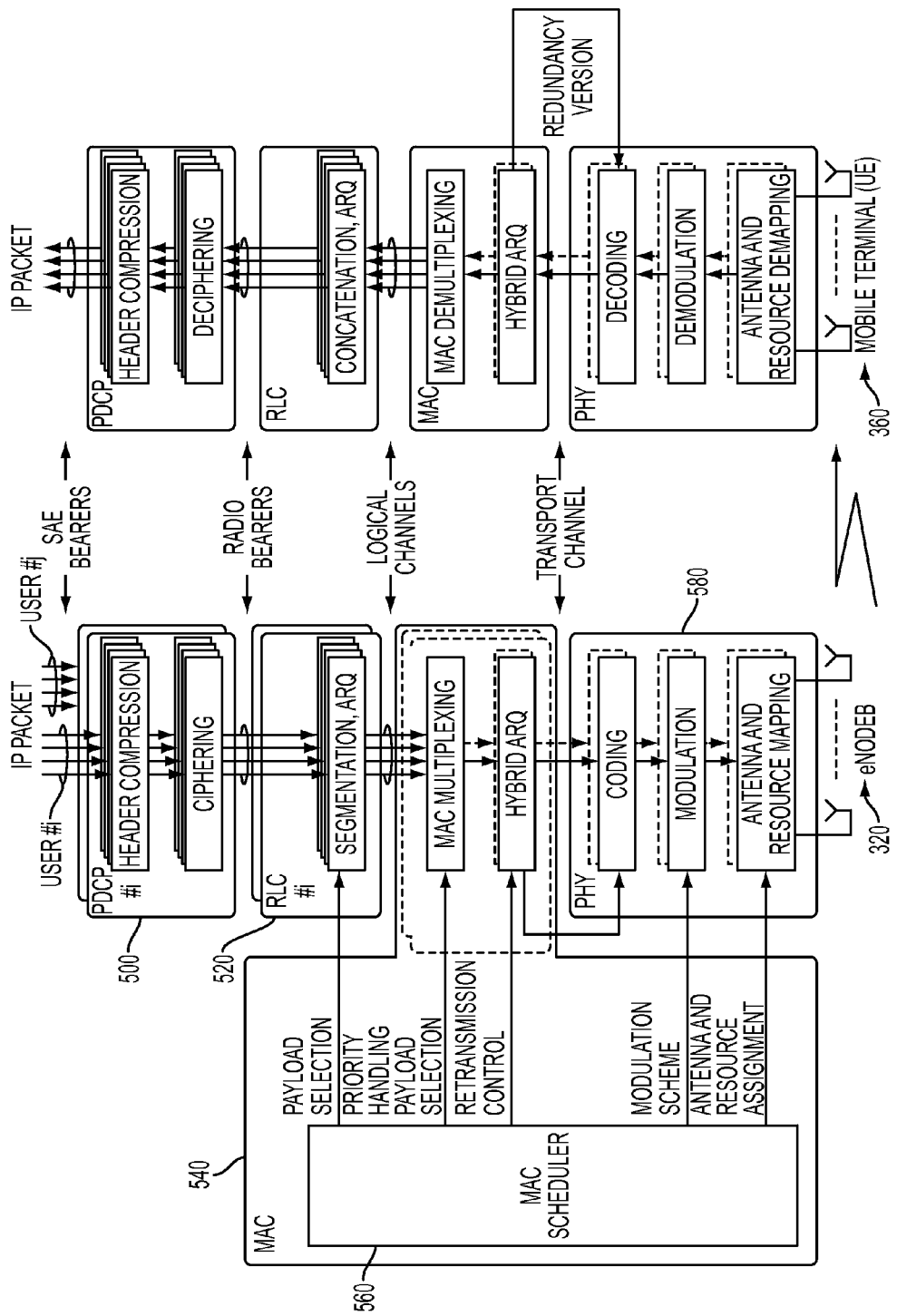
FIG. 5 shows receive and transmit processing chains associated with the communication system of FIG. 4.

One exemplary LTE architecture for processing data for transmission by an eNodeB 320 to a UE 360, i.e., in the downlink (DL) is shown in FIG. 5. Therein, data to be transmitted by the eNodeB 320, e.g., IP packets, to a particular user is first processed by a packet data convergence protocol (PDCP) entity 500 in which the IP headers can be compressed and ciphering of the data is performed. The radio link control (RLC) entity 520 handles, among other things, segmentation of—and/or concatenation of—the data received from the PDCP entity 500 into protocol data units (PDUs). Additionally, the RLC entity 520 provides a retransmission protocol (ARQ) which monitors sequence number status reports from its counterpart RLC entity in the UE 360 to selectively retransmit PDUs as requested. The medium access control (MAC) entity 540 is responsible for uplink and downlink scheduling via scheduler 560, as well as the hybrid-ARQ processes. A physical (PHY) layer entity 580 takes care of coding, modulation, and multi-antenna mapping, among other things. Each entity 500-580 shown in FIG. 5 provides outputs to, and receives inputs from, their adjacent entities by way of bearers or channels as shown. The reverse of these processes are provided for the UE 360 as shown in FIG. 5 for the received data, and it will be appreciated by those skilled in the art that, although not shown in FIG. 5, the UE 360 also has similar transmit chain elements as the eNB 320 for transmitting on the uplink (UL) toward the eNB 320 and the eNB 320 also has similar receive chain elements as the UE 360 for receiving data from the UE 360 on the UL.

Having described some exemplary LTE devices in which aspects of uplink antenna selection according to embodiments can be implemented, the discussion now moves on to sounding reference signals which can, as described above, be used in an uplink antenna selection process. Sounding reference signals (SRS) can be used by the LTE eNB to obtain information about the uplink channel, i.e., in the transmit direction from a mobile station or UE toward an eNB. The basic principle behind sounding is that the UE periodically transmits a wideband signal according to a configuration sent from the eNB. Since the signal is known by the eNB it can be used to calculate a channel estimate for the UE's uplink channel which in turn can be used by various RRM-related algorithms such as scheduling, link adaptation and power control.

Figure 6:
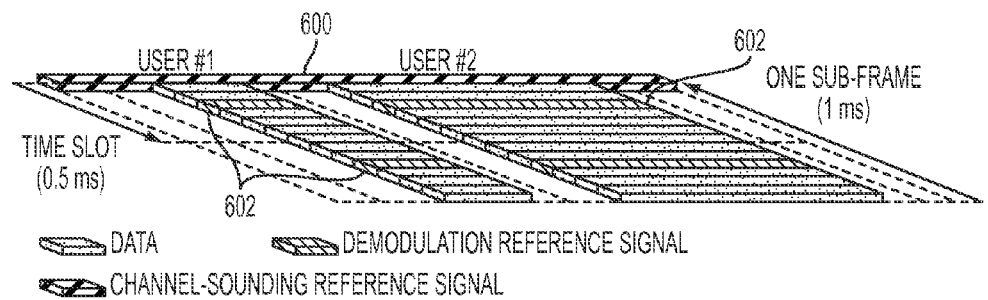
FIG. 6 shows a subframe including a sounding reference signal.

The manner in which these sequences are generated is described in detail in the 3GPP standards document 3GPP TS 36.211 "Physical Channels and Modulation" to which the interested reader is directed for more information. However to briefly describe them here, FIG. 6 shows one example of a non-hopping SRS 600 (the figure shows the SRS in the first OFDM symbol of the subframe, but the 3GPP standard allocates it to the last OFDM symbol of the subframe). Note that the 'Demodulation Reference Signals' 602 are limited to the occurrence of PUSCH transmission and to the scheduled subcarriers, whereas the SRS can cover a larger or smaller bandwidth and is transmitted regardless of any PUSCH/PUCCH transmission.

The Sounding Reference Signals can be configured per individual UE as e.g. (a) "single-shot" configured by RRC message, (b) periodic configured by RRC message and (c) "single-shot" configured by PDCCH command. Options (a) and (b) exist in the 3GPP rel-9 standard. Option (c) is being discussed for 3GPP rel-10 (see e.g. R1-110558). Sounding Reference Signals can use TDM-, FDM- and CDM-separation. For periodic configuration, the periodicity and starting time for transmission of SRS can be configured. The IE srs-ConfigIndex [as described in the above-referenced 3GPP TS 36.331] configures the periodicity up to every 320 ms plus a time offset, resulting in maximum 320 unique time positions. The frequencies (OFDM subcarriers) used for transmission of SRS can be configured per UE. The IE srs-Bandwidth [36.331] configures up to 4 frequency "blocks". The IE freq-DomainPosition [36.331] defines where the frequency "block" starts, providing up to 24 alternatives, when the smallest value of srs-Bandwidth [36.331] is used. The IE transmissionComb [36.331] configures odd or even subcarriers.

It is also possible to configure frequency-hopping SRS using the IE srs-HoppingBandwidth [36.331]. There are 4 different hopping sequences. The IE freqDomainPosition [36.331] defines the starting position for the hopping sequence, providing up to 24 alternatives.

In addition to the TDM- and FDM-structures described above, it is also possible to configure a CDM-structure. The IE cyclicShift [36.331] defines one out of 8 orthogonal signals. All the options above apply to periodic SRS-transmissions. Additionally, there is a configuration alternative for single SRS transmission (IE duration [36.331]).

For a 20 MHz system bandwidth it is thus possible to define up to 320*24*8=61440 periodic and nominally unique signals. Each individual UE can be assigned one specific SRS configuration out of these 61440 signals using dedicated signalling (RRCConnectionReconfiguration [36.331]). Note that use of TDM for separating SRS requires synchronization between cells. That is quite feasible, e.g. using GPS receivers in the RBSes/antennas. How many of these nominally unique SRSes can actually be used, i.e. reliably detected, depends mainly on the interference and UE transmission power.

Normal reception of SRS in a cell is assisted by all other UEs in the cell not sending any regular PUSCH/PUCCH transmissions in the uplink during periods when some UE may send SRS. Other UEs are informed about the SRS opportunities through system information block 2 (SIB2) and/or dedicated signalling (IE SoundingRS-UL-ConfigCommon [36.331]). The signals can nevertheless be reliably received at rather low SINR (around −5 dB). Reception outside the nominal cell coverage is normally helped by configuring the same SRS opportunity periods in adjacent cells, i.e. UEs in all adjacent cells typically do not transmit anything, except SRS, during the SRS transmission opportunities. Detection may also, to some degree, be enhanced by soft combination of consecutive SRS receptions, but that is an implementation option.

The transmitted power for SRS can be modified in relation to normal PUSCH power setting using the parameter $P_{SRS\_OFFSET}$. Boosting the SRS power, by setting the offset to a positive value, is often not possible in border areas between antennas, since the UE is more likely to operate close to maximum power in such areas. The resolution of the nominally unique sounding reference signals is thus dependent on radio conditions and configuration, but it is clear that there is a substantial number of periodic sounding symbols, on the order of $10^4$, which are realistically useable as unique signals. Additionally, the "single-shot" activation can be used to create an even higher number of locally UE-specific sounding symbols.

Using the lowest SRS periodicity, 320 ms, implies some latency in detection of a UE entering a new antenna area. High speed UEs would benefit from sending with a smaller periodicity. It is also preferred to use only a fraction of the possible SRSes, since the sounding opportunities are not used for regular transmission. This drawback may be mitigated by allowing collisions between data and SRS for some fraction of SRSes, preferably those assigned to slow-moving UEs.

Figure 7:
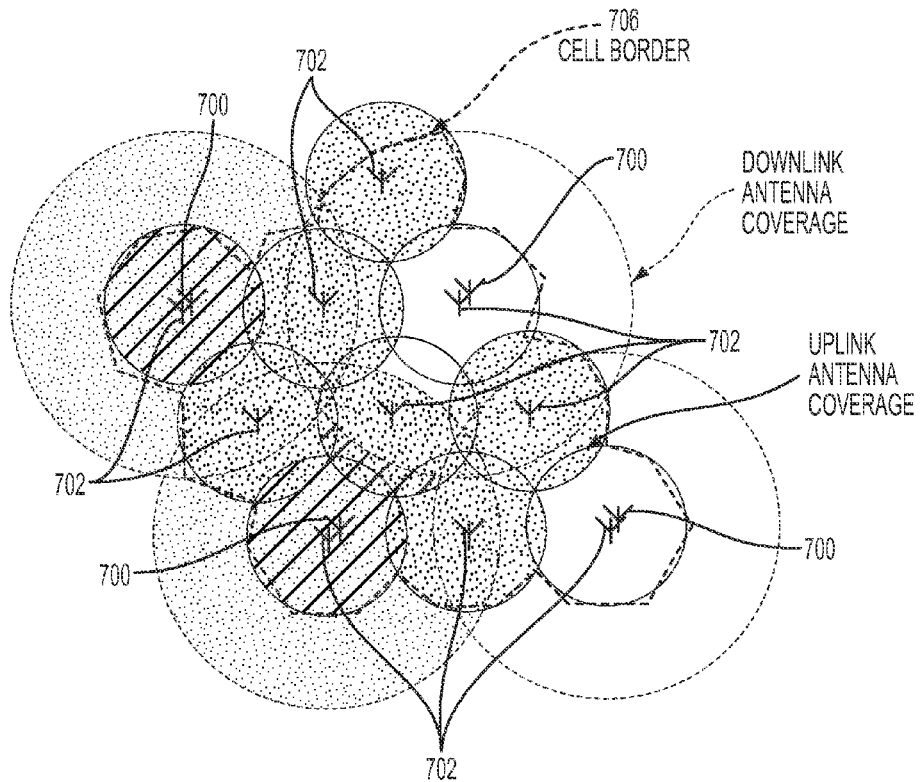
FIG. 7 illustrates a multi-transmission point radiocommunication system in which embodiments can be implemented.

With this context in mind, the discussion now turns to using such SRS to select one or more uplink antenna(s), e.g., in a multi-transmission point environment, according to embodiments. These embodiments are based on initially detecting the presence of a specific UE in, or close to, an area covered by a specific uplink antenna and then allocating complete reception (and optionally transmission) resources for that UE in that uplink antenna (and optionally associated downlink antenna(s)). FIG. 7 shows an example where four downlink antennas 700 and ten uplink antennas 702 serve one cell 706 denoted by the dotted, irregularly shaped line. The cell 706 is defined by having some common attributes, e.g. cell broadcast information (sent as System Information Blocks, SIBs) and physical cell id (PCI).

Figure 8:
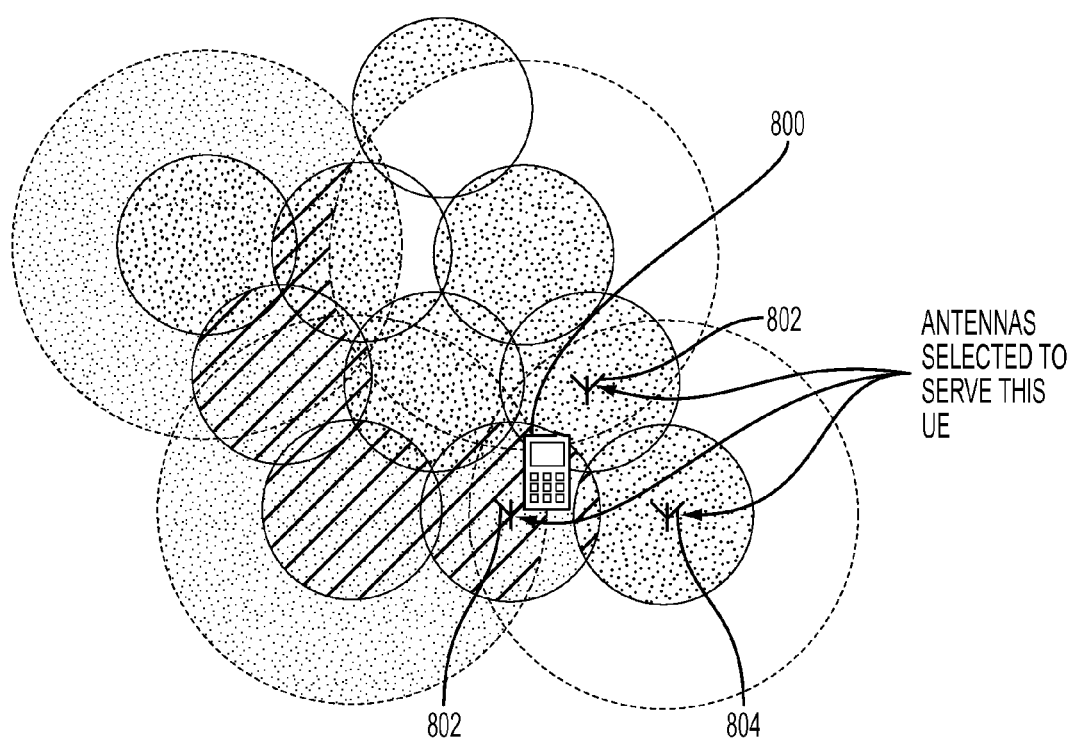
FIG. 8 shows selection of uplink and downlink antenna(s) for serving a user equipment.

Using the same cell configuration pattern as shown in FIG. 7, FIG. 8 shows the location of one specific UE 800 and the antennas, two uplink antennas/antenna devices 802 and one downlink antenna/antenna device 804, which are activated to support data transfer to and from this UE 800. The number of antennas which are activated to serve data transmission to a specific UE can be one or several depending on, for example, the level of processing being performed by the antenna devices to which the antennas are connected. Two examples of such processing for uplink transmission are: (a) each antenna device includes a complete E-UTRAN reception chain, including protocol layers PHY, MAC, RLC and PDCP (in this case protocol states/contexts must be forwarded when the UE moves and the serving antenna device is changed) and (b) each antenna device only includes basic PHY layer functions, so that in-phase and quadrature (IQ) samples are transferred to a coordinating point. The coordinating point for this UE performs joint RX processing of all antenna signals (for this UE). According to this embodiment, each antenna device 802, 804 will thus comprise two sets of receivers: (a) signature receivers, which only detect the UE signatures (e.g., sounding reference signals; either all possible signals or an assigned subset of them) and (b) "normal" receivers, which decode PUSCH/PUCCH signals.

Various subfunctions can be provided to enable selecting active antennas per UE based on uplink SRS detection according to embodiments. These can include one or more of the following:

1. Alignment (coordination) of "reserved resources for uplink signatures" between antenna areas (including cells). As explained above, this function can be performed in order to minimize interfering transmissions and thereby improving detection of a UE entering an antenna area, ideally well in advance of that UE entering the antenna area. The alignment (coordination) is preferably done via automatic coordination.
2. Alignment (coordination) of assignment of "uplink signatures" to individual UEs, in order to make "uplink signatures" locally unique.
3. Logic to select the best candidate UEs (signatures) per antenna to search for. This can reduce the task of the detection function and/or improve detection capability and reliability, by reducing the number of potential signatures to monitor per antenna.
4. Detection of candidate UEs (signatures), as defined in step 3, per antenna.
5. Selecting the best uplink antenna(s). This function is preferably based on comparison of uplink quality. The "uplink signatures" are part of this quality assessment. In order to compare several links, it is preferred to either (a) compare at "same" point in time or (b) if the UE uses a known uplink power. SRS uses variable transmit power, according to existing standards (36.331, 36.211), but it is possible to use a positive offset to increase the likelihood that the UE will transmit SRS with its maximum power, which is known. Yet another alternative is to add a separate "quality measurement phase" for the UEs, which have been detected (with some likelihood of correctness).

6. Reconfiguration of SRS in two different subcases. The first case is a revocation of an SRS when UE goes idle and the second case is the change of the SRS when two UEs with same SRS come close to each other.

In the following discussion, examples of the above-described subfunctions are provided in a HetNet environment, i.e. where small and large cells are mixed and operate on the same (or at least overlapping) carrier frequency. However, it will be appreciated by those skilled in the art that the invention is not limited to implementation in a HetNet environment and can, for example, be used in any environment in which multiple or overlapping radiocommunication coverage is present. In the below examples, the large cells are called "macrocells" and the small cells are called "picocells". The following examples also illustrate how coordination can be performed at one centralized location for each macrocell, however it will also be appreciated that, alternatively, coordination can be performed in a distributed way, where all antenna devices coordinate among themselves in a peer-to-peer fashion.

Regarding coordination of reserved resources between cells, in current standards the reserved resources are sent in broadcast messaging (e.g., SIB2) and apply per cell. One alternative method to tell UEs which uplink symbols shall not be used for PUSCH, could be to configure all UEs by dedicated signaling.

Figure 9:
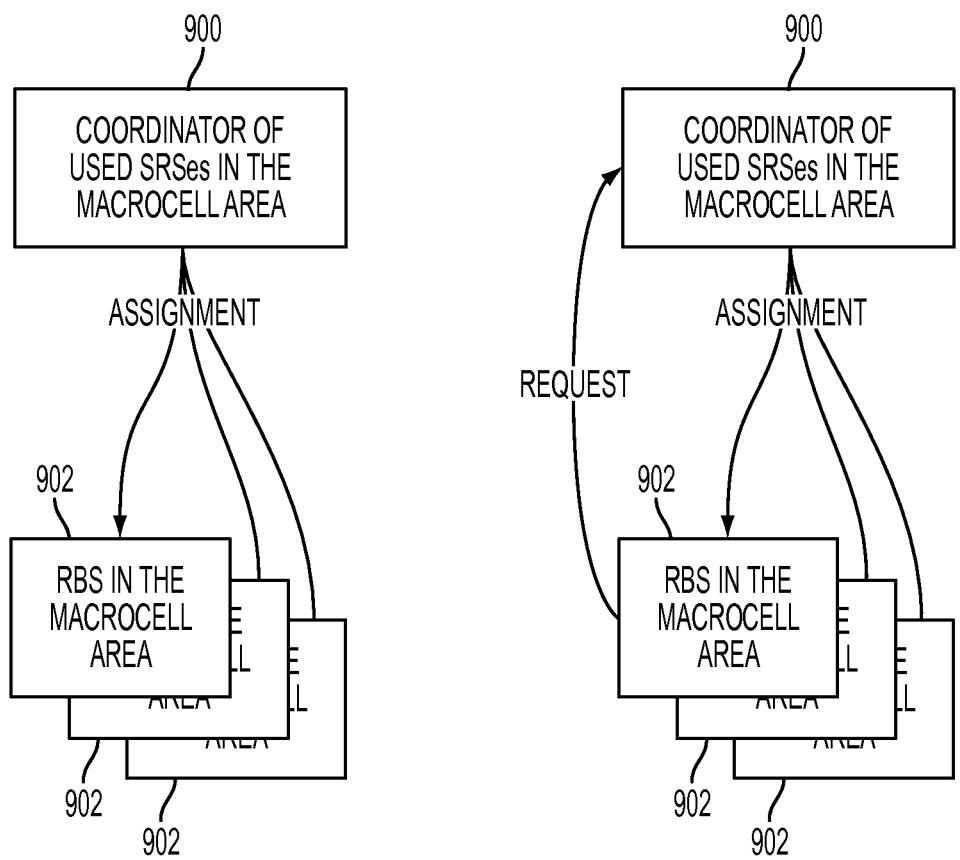
FIGS. 9-10(b) depict assignment of SRS resources by a coordinator node according to an embodiment.

According to this embodiment, there is a central coordinator 900, shown conceptually in FIG. 9, which assigns the reserved blocks of SRSes. The coordinator 900 function could e.g. be located in any node, e.g. in an eNB or in another node. This case can be subdivided into two subcases: a first subcase where the RBSs 902 (or antenna device) requests SRSes and the coordinator 900 assigns the SRSes, e.g., as shown on the right hand side of FIG. 9, or a second subcase where the coordinator 900 only assigns SRSes without requests, e.g., as shown on the left hand side of FIG. 9. Other variants associated with resource coordination include, for example, that the assignment includes a range of SRSes, which the RBS 902 may assign to UEs.

Figure 10A:
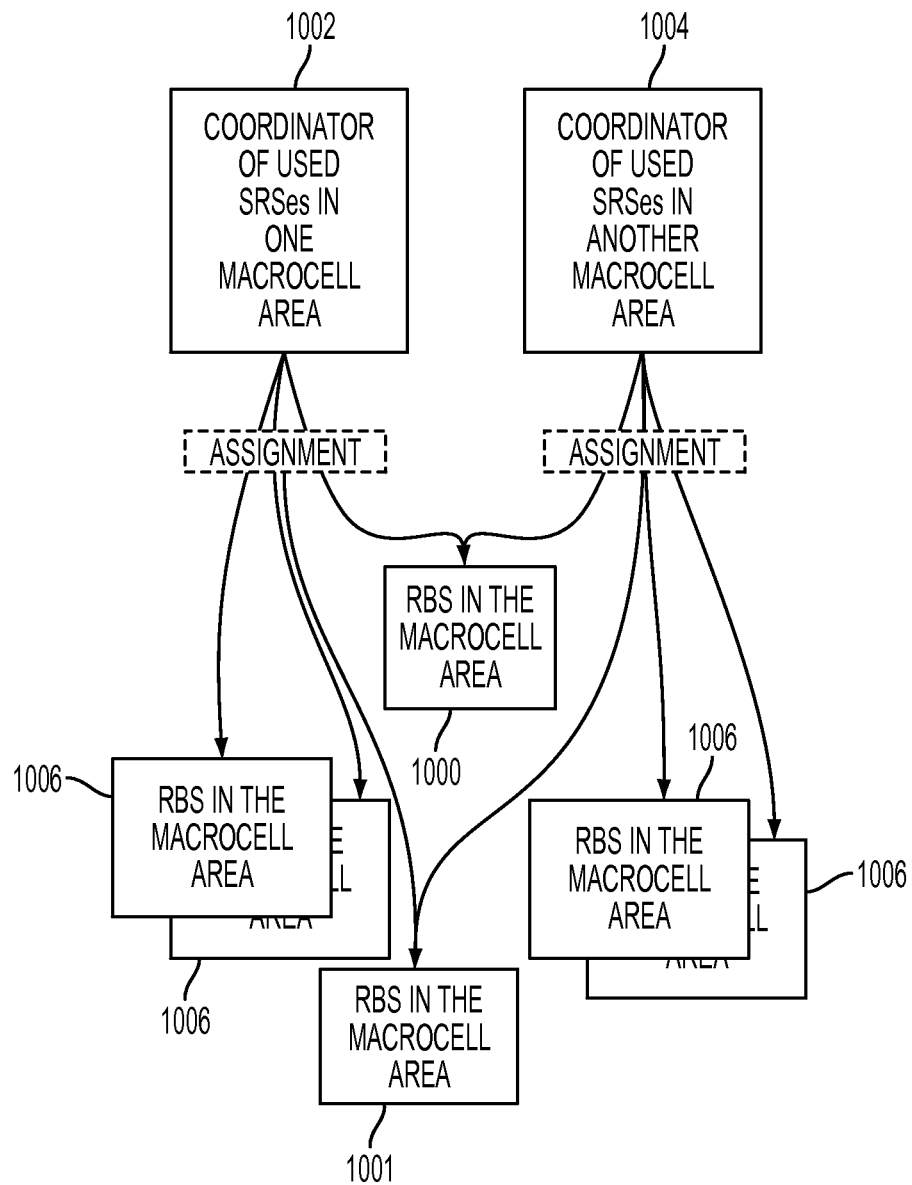
Figure 10B:
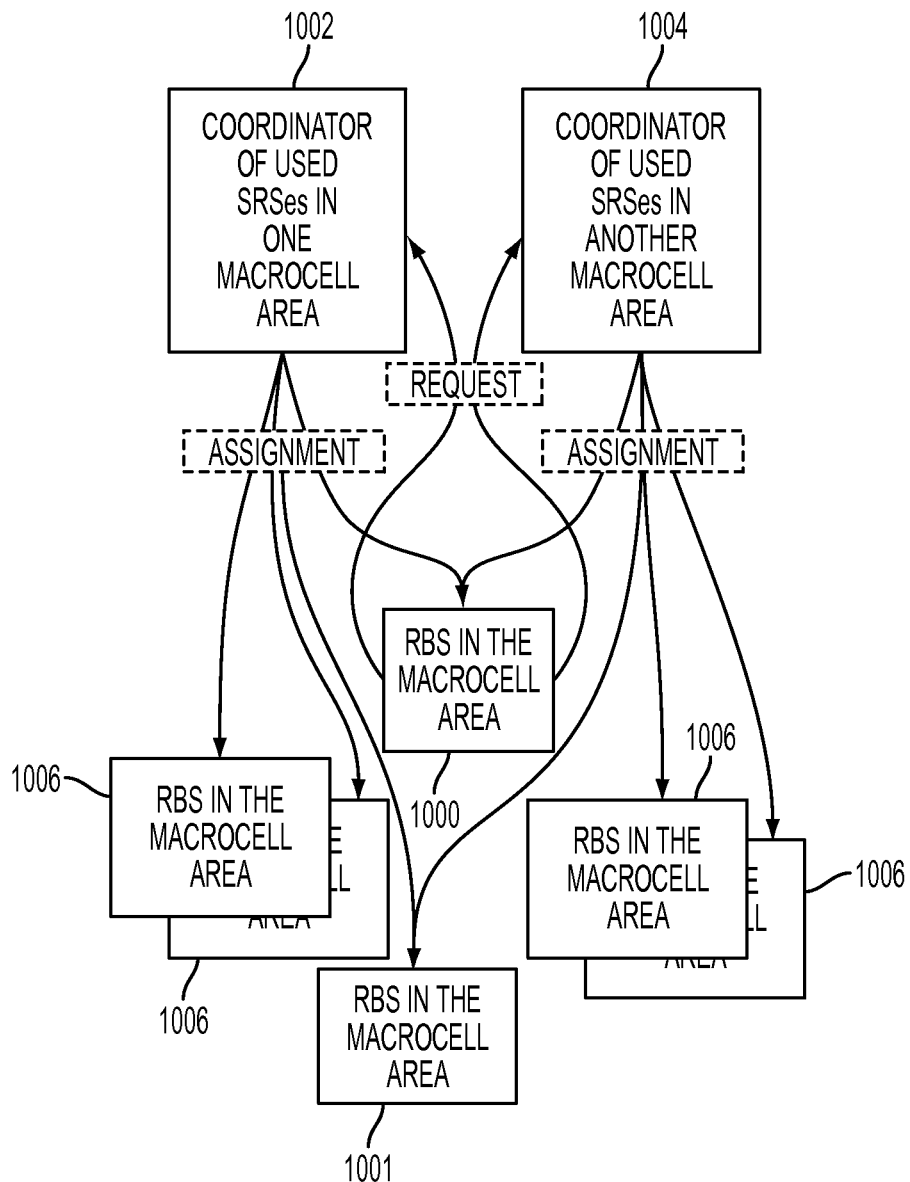

Yet another variant associated with resource coordination is that an RBS 1000 or 1001 may consider itself part of multiple macrocell areas, which may use somewhat different blocks of SRSes as shown in FIG. 10(a). The RBSs 1000 and 1001 will, in this case, assume the joint set of SRS resources are reserved, i.e. not used for PUSCH/PUCCH, and can receive multiple assignments of SRS resources for uplink selection signaling from different coordinator nodes 1002 and 1004. Other RBSs 1006 may instead receive assignments from only one coordinator node 1002 or 1004 as shown. Assignments can be made on a push basis, as shown in FIG. 10(a) or upon request, as shown in FIG. 10(b) (albeit only one set of requests is shown in FIG. 10(b) in order to avoid obscuring the figure). The assigned resources will result in reserving some time/frequency resources for SRS transmission by one or more UEs. Using the current standard implies that SystemInformationBlock2 and/or RRCConnectionReconfiguration (IE SoundingRS-UL-ConfigCommon) are used to inform the UEs, however the present invention is not limited to this mechanism. The 'Request' and 'Assignment' signaling for requesting and assigning these resources can be performed using additional X2 information elements (IEs) or a new interface to the coordinator node.

In addition to coordinating reservation of SRS resources to different RBSs, embodiments further consider coordinating assignment of those SRS resources to the UEs for transmitting sounding reference signals. Two exemplary situations are described here for cases wherein radiocommunication services become available to a UE in an area, i.e., (a) when a UE starts communication in an area having multiple transmission points using a random access procedure, and (b) when a UE is handed over to, e.g., a cell with multiple antennas or transmission points.

Considering the random access case first, the assignment of an SRS to a UE occurs immediately after the switch from idle state to RRC connected state, since the UE may move and its location needs to be tracked. An exception could be that some UEs are recognized (e.g. due to subscription, "UE type", or UE capabilities) as stationary. The random access case can further be divided into two different cases. The first sub-case is for the initial access for UEs in the idle state and the second sub-case is for subsequent random access for UEs in the RRC connected state. In the first sub-case, the UE is allocated a new SRS and then the same SRS is reused in the second sub-case. The Cell Radio Network Temporary Identifier (C-RNTI) can be used as the UE identifier between the first and second sub-cases for identification of the UE.

In order to assign a locally unique SRS the network should know or approximate: (a) the UE location and (b) the SRSes in use around that location. Determining the UE's location/position can be achieved by, for example, monitoring the uplink signal quality for the initial access. The location is sent to a coordinating function, which assigns an SRS with the least risk of SRS collision. The coordinator can use auxiliary information, e.g. recent mobility information, to reduce the risk of having two UEs with the same SRS near the same antenna area. Moreover, the coordinator may add speed detection and use this information to assign denser patterns to high-speed UEs, in order to reduce the latency when activating new antennas.

Figure 11:
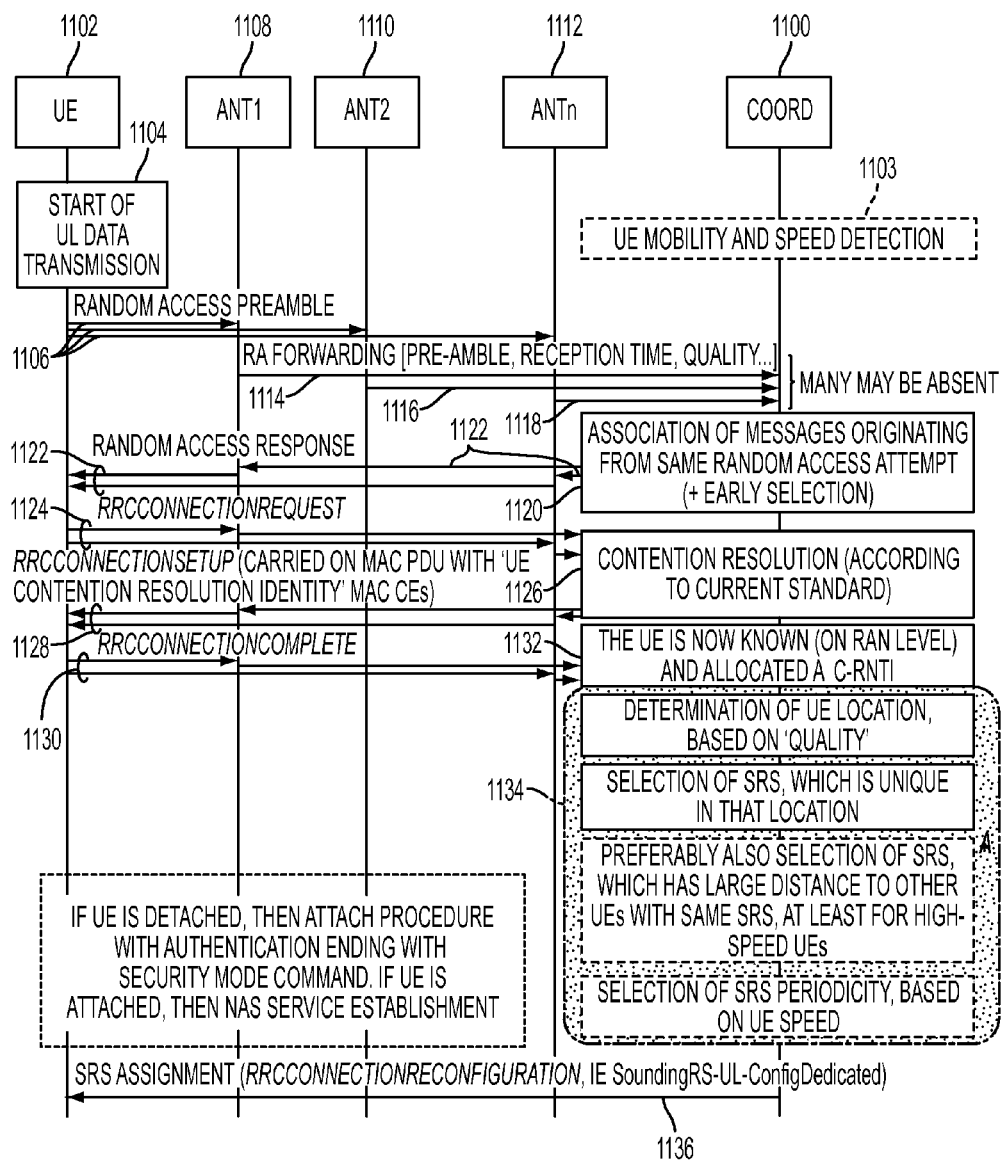
FIG. 11 is a signaling diagram associated with selection of an SRS resource for a UE according to an embodiment.

An exemplary signaling scheme at initial access (i.e., when the UE is in the Idle state) for coordinating SRS assignments according to an embodiment is shown in FIG. 11. Therein, the coordinator node 1100 performs ongoing processes to acquire auxiliary information which can be used in assigning SRS resources, e.g., determining UE 1102 mobility and speed detection at block 1103. The UE 1102 begins to transmit its random access preamble at step 1104. The random access preamble, as indicated by arrows collectively referenced by 1106, is received by a number of antenna elements or devices 1108, 1110 and 1112. Each antenna element 1108, 1110 and 1112 which receives the random access preamble transmits a reporting signal, referred to in FIG. 11 as an RA Forwarding signal 1114, 1116, and 1118, respectively, to the coordinator node 1100. It will be appreciated that, typically, not all of the antenna devices which are managed by coordinator node 1100 will receive each a random access signal and report on same.

The coordinator node 1100 determines which RA Forwarding messages originate, or are associated with, from the same UE Random Access message, e.g., from UE 1102, as shown by step 1120. This can be accomplished, for example, in the following ways. If detection is performed in an antenna device, then various information can be provided in the RA forwarding messages 1114, 1116 and 1118 which can be used for this purpose, e.g., the pre-amble sequence (one of up to 64), the pre-amble reception time (at least on a per subframe basis, but potentially with higher accuracy), and, if physical layer (protocol) signals are brought to the coordinator node 1100, then joint detection can be used. At this stage, the coordinator node 1100 may also make an initial, early selection of which antenna devices will be used to receive uplink transmissions from the UE 1102. Based on that selection, the coordinator node can send random access responses back to the UE 1102 via the initially selected antenna devices, e.g., antenna devices 1108 and 1112 in this example, which forward the random access response over the air interface to the UE 1102 (as shown by various signals numbered 1122).

Upon receiving the random access response, the UE 1102 can then transmit an RRCConnection Request signal 1128, which initiates the RRC connection process according to conventional techniques and signaling as illustrated via signals/steps 1128-1132. Upon completion of the RRC connection process, the UE 1102 is known on a RAN level, i.e. the so-called contention resolution is completed, and the UE 1102 is allocated a C-RNTI. At this time, the coordinator node 1100 can then assign a locally unique SRS to the UE 1102 as described above and shown in block 1134, e.g., by determining the UE 1102's location, selecting an SRS which is unique in that location and, preferably, is not reused within a predetermined distance, and also to select SRS transmission periodicity based on UE speed. The selected SRS resource is then indicated to the UE 1102 by transmitting a signal 1136 back to the UE 1102.

Figure 12:
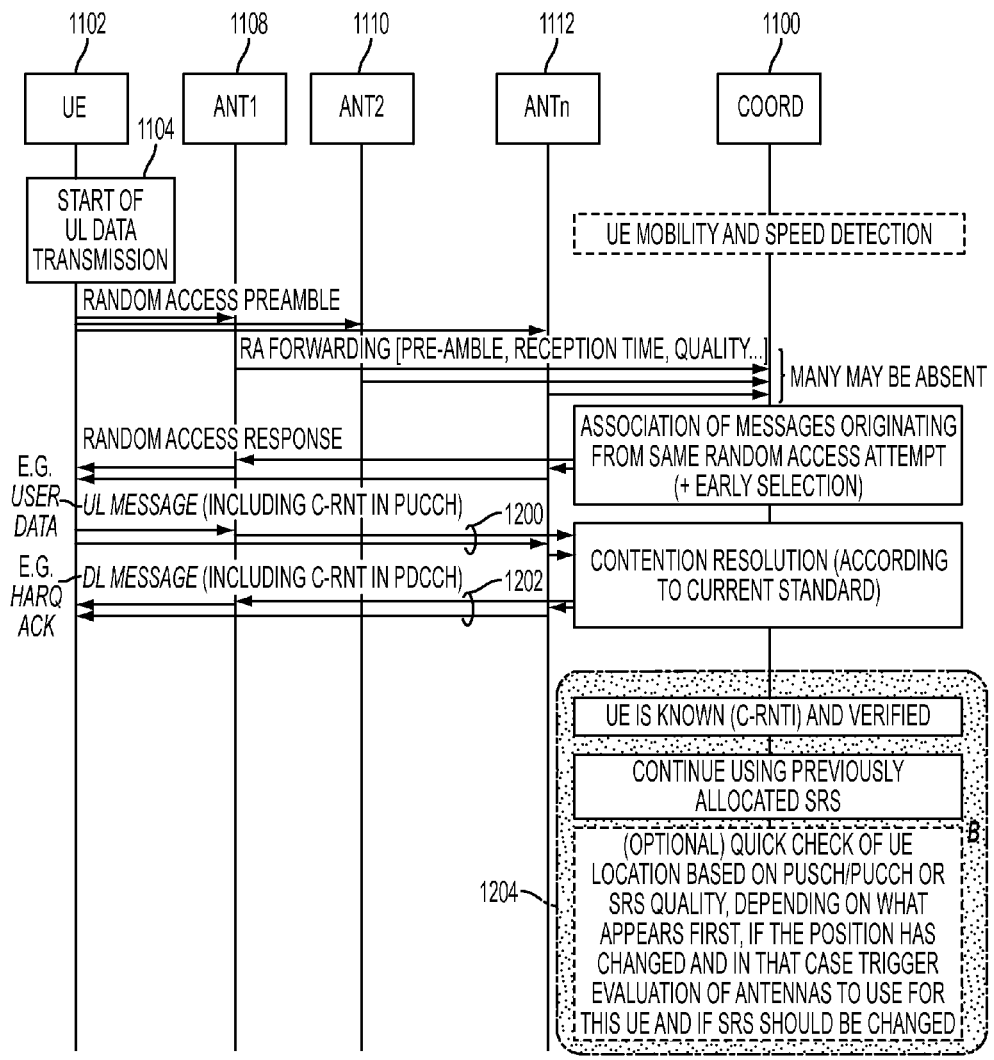
FIG. 12 is a signaling diagram associated with selection of an SRS resource for a UE according to another embodiment.

A signaling diagram for a subsequent random access (i.e., with UE 1102 in the RRC Connected state) is shown in FIG. 12. Therein, the same node reference numbers are used as in FIG. 11. This case is triggered by DL data arrival, UL data arrival or for positioning purposes. The DL data arrival and positioning cases may use the contention-free random access (not shown). In this example the initial aspects of the signaling are the same as for initial access in FIG. 11, and reference is made to the above description for those signals. However, after the random access response is received by the UE 1102, there is no need for RRC Connection setup process/signaling and, instead, the UE 1102 transmits, e.g., user data on the uplink PUCCH as shown by signaling 1200. Then a responsive DL message 1202 is sent back to the UE 1102, i.e., by all downlink antenna devices or a subset according to "early selection". SRS handling for this case, according to an embodiment, is shown in block 1204.

Note that, according to current standards, SRS transmission is suspended when the UE is in "DRX sleep mode". Considering that DRX "sleep period" can currently be configured up to almost 2.56 seconds, the UE position may have shifted considerably. According to an embodiment, therefore, it may instead be desirable to selectively activate SRS also during DRX. A special case of the random access situation is Radio Link Failure, where a UE may appear in a new location without normal network preparation, which case is discussed in more detail below.

Turning now to the handover case, i.e. handover into a cell supported by multiple antenna devices, this case can, for example, be handled in two ways. First, handover can be treated (for SRS assignment) in the same manner as a random access, as shown in FIG. 11 (or the contention-free version of that Figure). This can work well for E-UTRAN, since all handovers initiate with a random access. The network response should be fast enough to avoid the UE reverting to "RRC Re-establishment". Alternatively, handover can be treated using a two-step SRS assignment. A "cell-global SRS", i.e. one SRS out of a range which is not re-used in smaller antenna areas, will be initially assigned and all antennas will be activated to serve the UE. After a relatively short time period, the received quality values from the antennas will provide sufficient data to perform reconfiguration. Note that at 'RC Connection re-establishment' the previous SRS could be revoked and SRS assignment be repeated or, alternatively, the previous SRS be kept.

Figure 13:
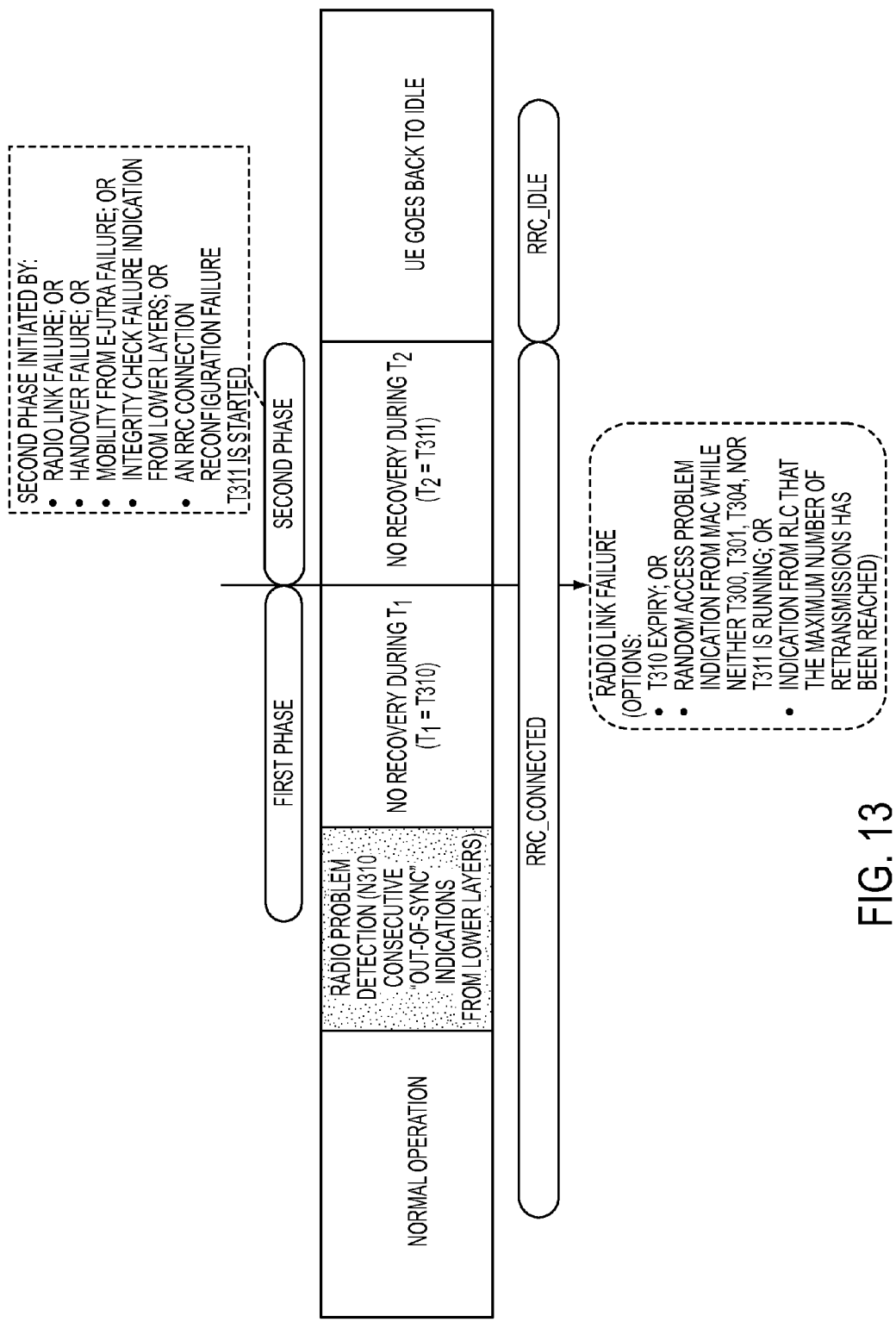
FIG. 13 illustrates aspects of radio link failure.

Considering now the radio link failure (RLF) case, a UE may be subjected to a combination of bad radio conditions and mobility which causes a loss of connectivity. One example is when a UE moves during a DRX period and appears in a new location in the next DRX period. That new location might be a new antenna area outside the antennas currently serving this UE or even outside the previous cell. In current E-UTRAN systems, these situations are handled by the RRC Connection re-establishment procedure. The overall sequence of events is shown in FIG. 13.

Using current procedures, RRC re-establishment will only succeed if the target cell is prepared, i.e., has accepted an incoming handover request for this UE. The currently described cases of RLF are shown in the Table below (extracted from 3GPP TS 36.300).

| Cases | First Phase | Second Phase | T2 expired |
|---|---|---|---|
| UE returns to the same cell | Continue as if no radio problems occurred | Activity is resumed by means of RRC Re-establishment procedure | Go via RRC_IDLE (NOTE 2) |
| UE selects a different cell from the same eNB | N/A | Activity is resumed by means of RRC Re-establishment procedure | Go via RRC_IDLE (NOTE 2) |
| UE selects a cell of a prepared eNB (NOTE) | N/A | Activity is resumed by means of RRC Re-establishment procedure | Go via RRC_IDLE (NOTE 2) |
| UE selects a cell of a different eNB that is not prepared (NOTE) | N/A | Go via RRC_IDLE (NOTE 2) | Go via RRC_IDLE (NOTE 2) |

NOTE:
a prepared eNB is an eNB which has admitted the UE during an earlier executed HO preparation phase.
NOTE 2:
Service may be restarted depending on application behaviour.

Figure 14:
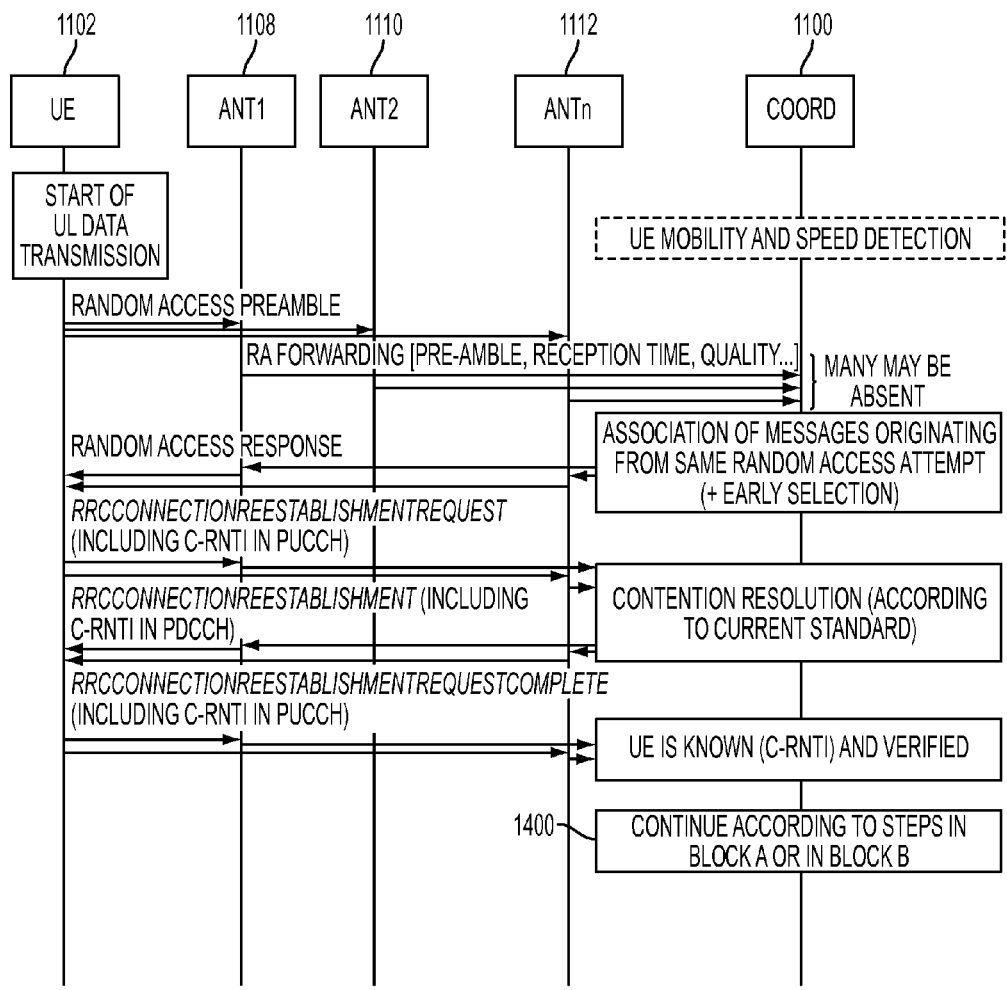
FIG. 14 is a signaling diagram associated with selection of an SRS resource for a UE after radio link failure according to an embodiment.

In a typical E-UTRAN system, the source cell may initiate a handover preparation in selected neighbour cells when a UE risks RLF, e.g. when the cell has not heard any uplink transmission for some period of time. That time should be on the order of T310 to T310+T311 (timers defined in 3GPP TS 36.331). An exemplary signalling flow associated with radio link failure is shown in FIG. 14, again using the node reference numbering from FIG. 11. The signalling is similar to that described above with respect to FIG. 11 and, therefore is not described in detail here. Note, however, that SRS handling can, for example, be performed in block 1400 in manners which are the same or similar to those described above in steps 1134 or 1204.

In a multi-antenna environment there is no need for "handover preparation" between antenna areas serving the same cell. Instead more surrounding antenna devices are activated ("prepared") for PUSCH/PUCCH reception in surrounding antennas, when a UE has not been detected for a period of time, similar to management of 'Active Set' in UTRAN. In a HetNet environment, i.e., a mix of small and large cells, the surrounding antenna device of a small cell is typically within the vicinity of the large cell. Hence the PUSCH/PUCCH reception for a UE, which is at risk of being 'dropped' in a small cell, is activated in the macro cell.

Figure 15:
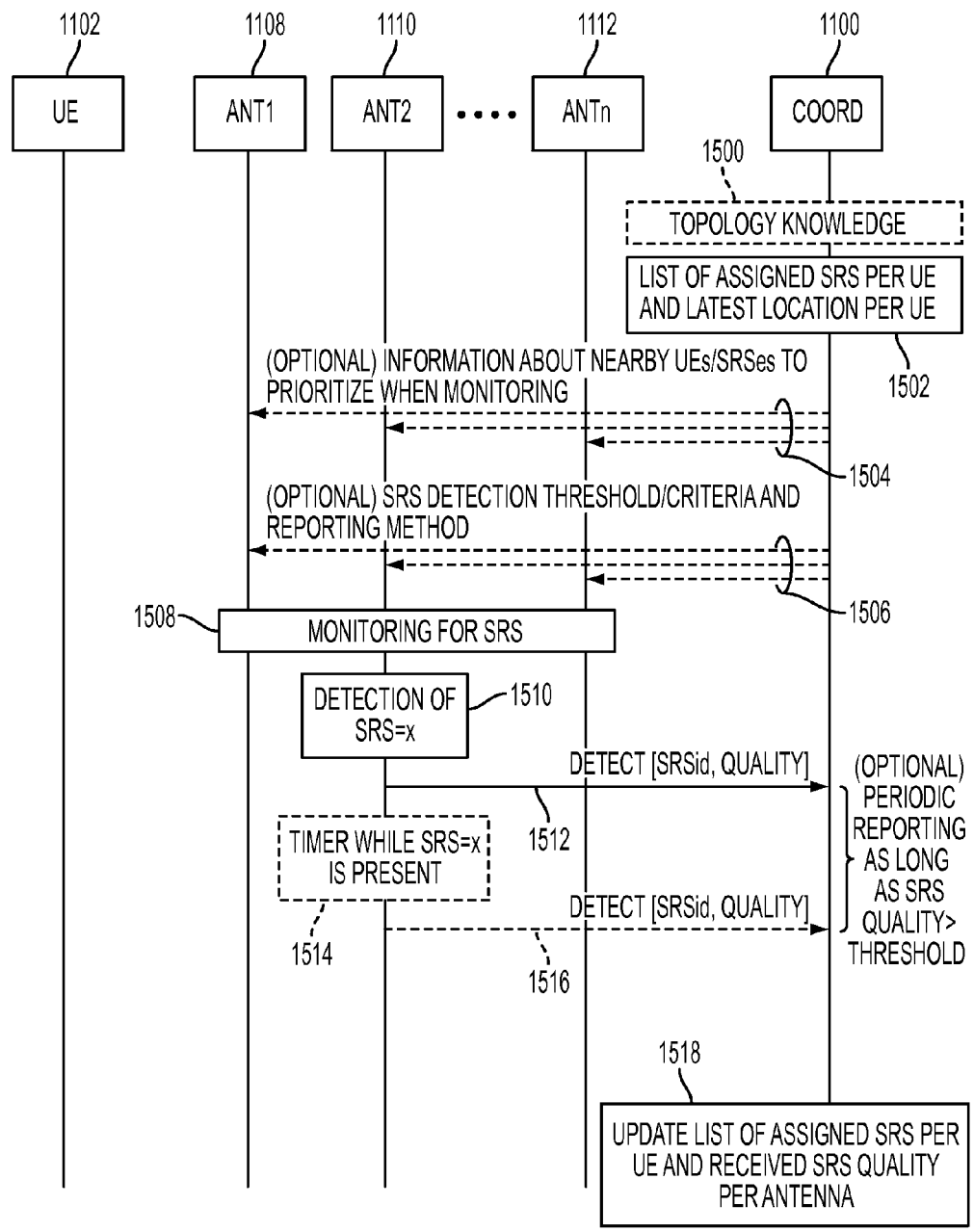
FIG. 15 is a signaling diagram associated with detection of SRS by antenna devices according to an embodiment.

Having assigned an SRS resource to UE 1102 using, for example, one of the aforedescribed techniques, embodiments then provide for detecting the assigned SRS when it is transmitted by the UE 1102. Signaling and processing associated with SRS detection and reporting according to an embodiment are shown in FIG. 15. Initially, the coordinator node 1100, which can be the same as coordinator 900 and can be disposed in one or more of the RBSs in a multi-transmission point system or in an independent node, begins with its knowledge of the topology of the system which it is coordinating, e.g., location of the antenna devices, etc., and a list of the SRS resources which have been assigned to the UEs and their latest determined locations, as indicated by blocks 1500 and 1502. The coordinator node 1100 may tell the nearby antenna devices 1108, 1110, 1112, etc., which SRSes are most likely to be detected as shown by signals 1504. The antenna devices 1108, 1110, 1112 may thus not need to monitor all possible SRSes, in order to save processing bandwidth for other tasks. The antenna devices 1108, 1110, 1112 can also use this information to enhance the detection capability, e.g. by increasing the distance between symbols (increase noise tolerance). The coordinator node 1100 may also tell the antenna devices 1108, 1110, 1112 what quality threshold should be applied for detection as indicated by signals 1506.

The various antenna devices 1108, 1110, 1112 then monitor their received signal energy for this particular SRS in step 1508. When an antenna device, e.g., antenna device 1110 in FIG. 15, has detected a particular SRS, according to this embodiment, it sends the SRS id and the received quality (e.g., SINR, soft symbol or similar) to the coordinator node 1100, as shown by block 1510 and signal 1512. The antenna device which detected the SRS of interest for UE 1102 may be configured to periodically send updated quality values for SRSes as long as they exceed a threshold (which threshold may, for example, be the same threshold as for the initial detection or slightly lower), as indicated by block 1514 and signal 1516.

Using the reports from antenna devices 1108, 1110, 1112, etc., the coordinator node 1100 can update its list of assigned SRS per UE and received SRS quality per antenna. Note that, according to current radiocommunication standards, SRS transmission is suspended when the UE is in "DRX sleep mode". That aspect may be considered when evaluating the SRS quality in order to improve selection of the most appropriate antennas. Two methods for doing so include: (a) antenna devices are informed about DRX active time and only report measurements to the coordinator during DRX active time and (b) antenna devices report all detected SRSes and the coordinator node 1100 decides if a specific measurement is from the intended UE, and thus are included in the list updating, or if a specific measurement is just "noise" and is not included in the list updating.

Figure 16:
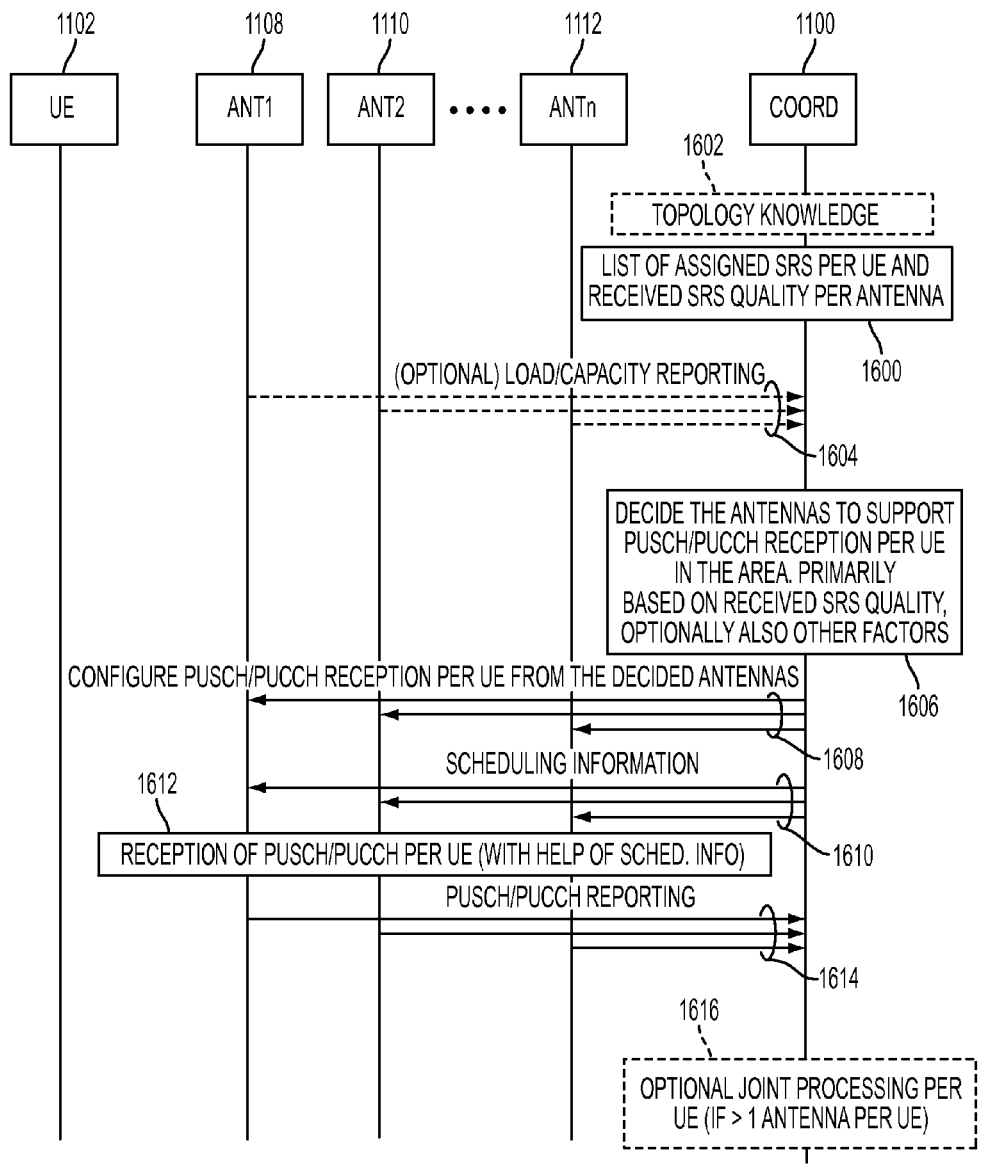
FIG. 16 is a signaling diagram associated with antenna selection by a coordinator node according to an embodiment.

The coordinator node 1100 can use the reported SRS quality information 1600, among other things, e.g., topology knowledge 1602, to select the "best" antenna device(s) to process further uplink data from UE 1102 as shown, for example, in FIG. 16. According to one embodiment, an objective for this part of the process is to select the best antennas for PUSCH/PUCCH transmission, i.e. configure these antennas to perform PUSCH/PUCCH processing. The optional "Load/capacity reporting" indicated by signals 1604 can inform about antenna device limitations, as well as transport limitations, which information (if available) can also be used in the antenna selection process 1606. The coordinator node 1100 selects the best uplinks to use for a specific UE 1102 and configures these antenna devices to perform signal reception via signals 1608.

Scheduling information can be sent to the selected antenna devices (in this example antenna devices 1108, 1110 and 1112) via signals 1610 and is used to help the PUSCH/PUCCH decoding. This scheduling information contains, for example, the ordered transmission format, so that the antenna processing need not blindly try out all possibilities. The usefulness of this step depends on how much processing the antenna devices perform. Signal reception and reporting in block 1612 and signals 1614 may, for example, include transport of the baseband signal to the coordinating processor 1100, transfer of the decoded transport blocks or something in between. If more than one uplink antenna has been selected, the coordinating processor 1100 may optionally perform joint processing on the different received signals to make better symbol decisions of the received signal as indicated by 1616. In special cases, e.g. when each antenna is both for uplink and downlink, the antenna selection can also apply to the downlink.

Figure 17:
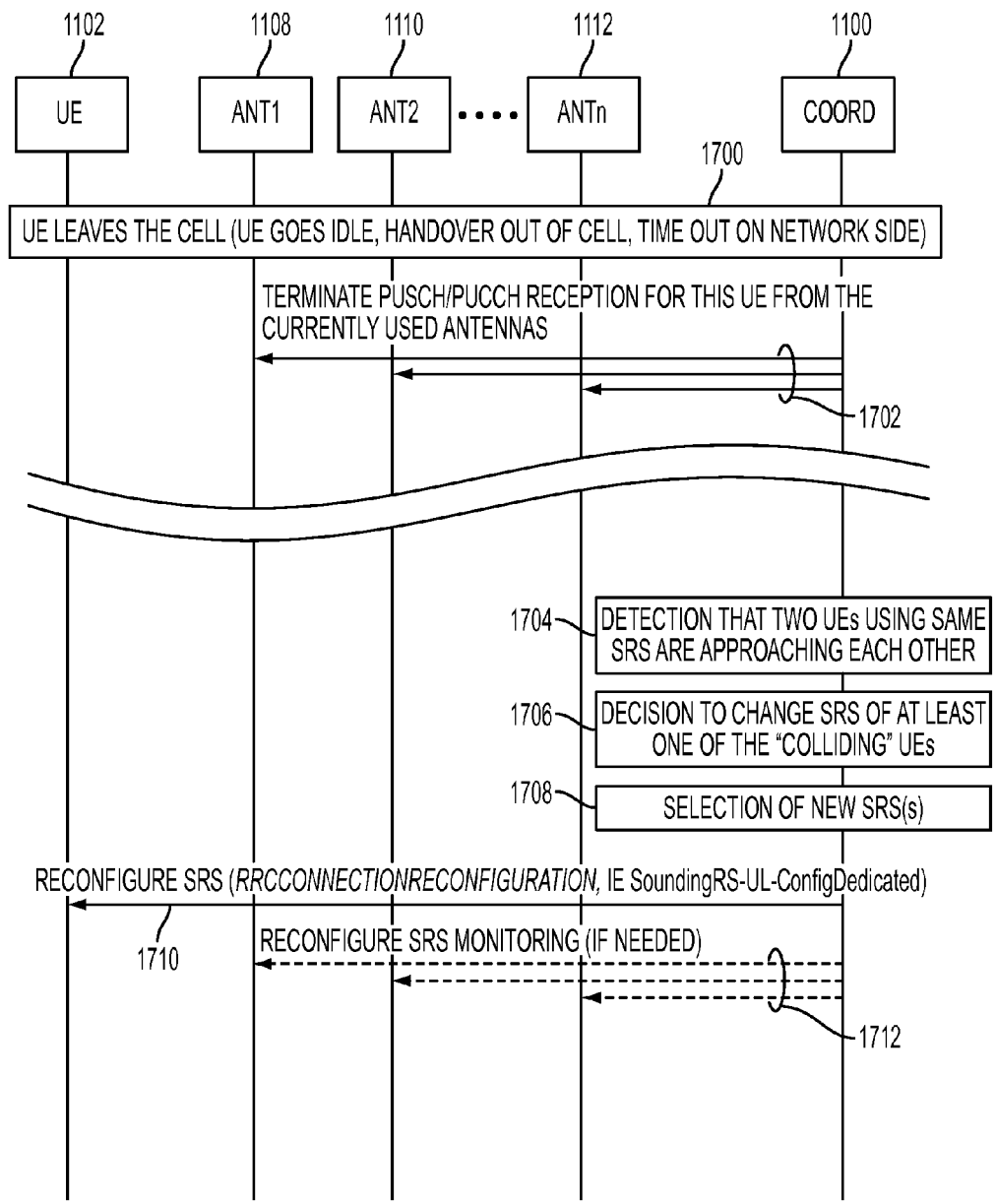
FIG. 17 is a signaling diagram associated with various reconfiguration cases associated with embodiments.

At some times, it may be desirable to reconfigure the SRS resource which has been allocated to a UE 1102 as shown, for example, in FIG. 17. One case occurs when the SRS is revoked (step 1700) when UE 1102 leaves the cell (e.g., UE goes Idle, handover out of cell including RRC re-establishment, general time-out on network side). Then, the coordinator node 1100 can send signals 1702 to the previously selected antenna devices 1108, 1110 and 1112 to terminate PUSCH/PUCCH reception for this UE 1102. Another case occurs when two UEs which have been allocated the same SRS resource come close to one another, as shown by block 1704. Then, the coordinator node 1100 can decide to change the SRS resource for at least one of the UEs (step 1706) by selecting a new SRS resource for that UE in step 1708. The coordinator node 1100 can then send a signal to the UE 1102 to reconfigure its SRS transmissions on the new SRS resource via signal 1710 and, if needed, can reconfigure the antenna devices to perform SRS monitoring as described above for UE 1102 on the new SRS resource.

Figure 18:
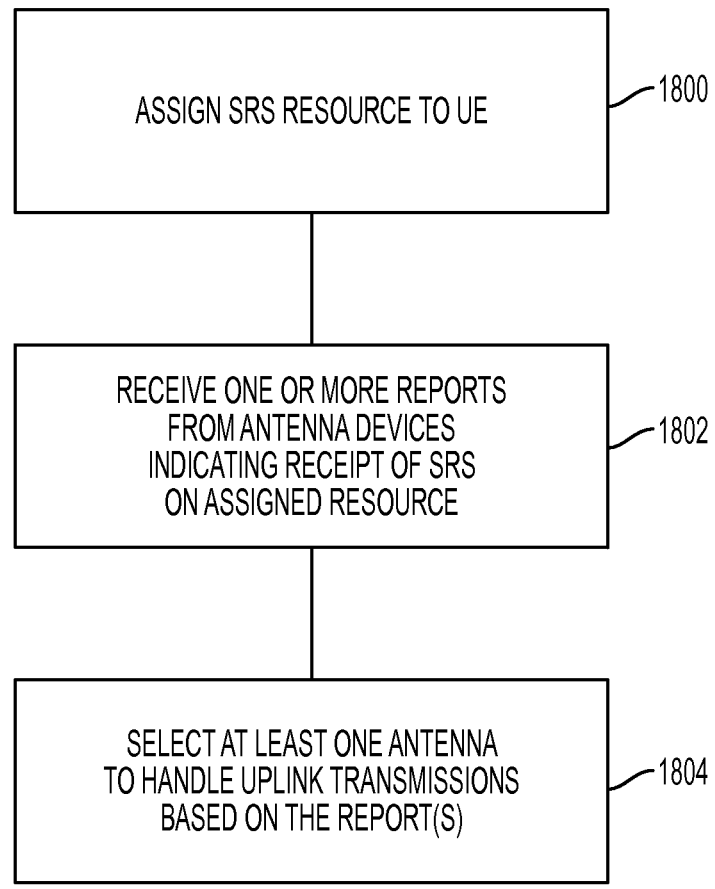
FIG. 18 is a flow chart illustrating a method for uplink antenna selection according to an embodiment.

Embodiments described above enable, among other things, adding capacity and coverage without adding new cells, thereby reducing the UE cell re-selection activity or frequency of adding cells, which increases the need for management of neighbor relations. An exemplary method for selecting at least one antenna to receive uplink transmissions from a user equipment (UE) from among a plurality of antennas includes the steps illustrated in FIG. 18. Therein, at step 1800, a sounding reference signal (SRS) is assigned, by a coordinator node, a sounding reference signal (SRS) resource to the UE. The coordinator node, at step 1802, receives one or more reports from antenna devices indicating receipt of an SRS on the assigned SRS resource. The coordinator node selects at least one antenna based on the one or more reports to handle uplink transmissions at step 1804. The method can further include the step of: configuring the at least one antenna to receive uplink transmissions from the UE.

Figure 19:
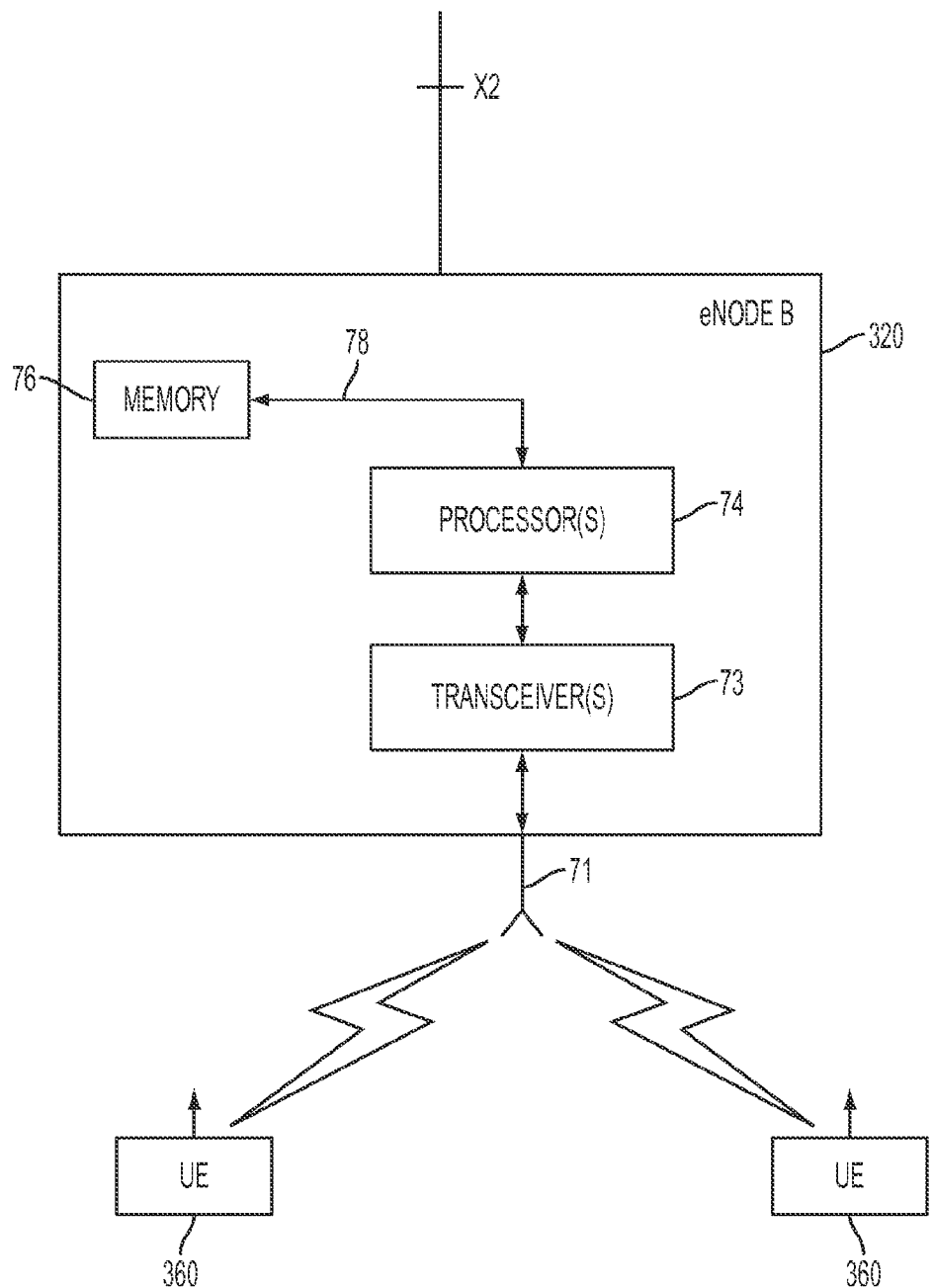
FIG. 19 depicts an exemplary eNodeB.

An exemplary base station 320, e.g., an eNodeB, which includes one or more of the antenna devices described above and which can receive and send signals toward a coordinating node 1100, as well as detect SRS transmissions from UEs is generically illustrated in FIG. 19. Therein, the eNodeB 320 includes one or more antennas 71 connected to processor(s) 74 via transceiver(s) 73. The processor 74 is configured to analyze and process signals received over an air interface from UEs 36, e.g., sounding reference signals, via the antennas 71 and transceiver 73, as well as to transmit signals towards the UEs 36. Moreover, eNodeB 320 can also include other interfaces, for example an X2 interface, on which to transmit and receive the information described above toward and from a coordinator node 1100. The processor(s) 74 may also be connected to one or more memory device(s) 76 via a bus 78. Further units or functions, not shown, for performing various operations as encoding, decoding, modulation, demodulation, encryption, scrambling, precoding, etc. may optionally be implemented not only as electrical components but also in software or a combination of these two possibilities as would be appreciated by those skilled in the art to enable the transceiver(s) 73 and processor(s) 74 to process uplink and downlink signals. A similar, generic structure, e.g., including a memory device, processor(s) and a transceiver, can be used (among other things) for other communication nodes, such as UEs 360 and coordinator nodes 1100.

The above-described embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for selecting at least one antenna to receive uplink transmissions from a user equipment, UE, from among a plurality of antennas comprises the steps of:
    assigning a sounding reference signal, SRS, resource to the UE,
    receiving one or more reports from antenna devices having said plurality of antennas, which reports indicate receipt of an SRS on said assigned SRS resource, wherein each of said antenna devices includes an SRS receiver with only basic PHY layer functions and further wherein said step of receiving further includes receiving, at a coordinator node, in phase (I) and quadrature (Q) samples associated with receipt of said SRS on said assigned SRS resource,
    selecting the at least one antenna based on said one or more reports, and
    coordinating reservations of said SRS resources in areas associated with said antenna devices.

2. The method of claim 1, wherein each of said steps of assigning, receiving and selecting are performed by a coordinator node.

3. The method of claim 2, wherein the coordinator node is a macro base station and the antenna devices are low power nodes.

4. The method of claim 1, wherein each of said steps of assigning, receiving and selecting are performed by said antenna devices in a peer-to-peer mode.

5. The method of claim 1, wherein said antenna devices include one or more of macro radio base stations (RBSs), pico RBSs, relays and other low power nodes.

6. The method of claim 1, further comprising:
    configuring the at least one antenna to receive said uplink transmissions from the UE.

7. The method of claim 1, wherein each of said antenna devices includes an E-UTRAN reception chain including protocol layers PHY, MAC, RLC and PDCP.

8. The method of claim 1, wherein each of said antenna devices further includes a further receiver for decoding PUSCH/PUCCH signals.

9. The method of claim 1, wherein in the step of coordinating reservations of said SRS resources in areas associated with said antenna devices, reserved SRS resources are not used for PUSCH or PUCCH transmissions.

10. The method of claim 9, wherein the step of coordinating reservations further comprises:
    receiving, by a coordinator node, a request for reserved SRS resources from an antenna device; and
    assigning, by said coordinator node, reserved SRS resources to said antenna device in response to said request.

11. The method of claim 9, wherein the step of coordinating reservations further comprises:
    assigning, by a coordinator node, reserved SRS resources to said antenna devices without receiving a request for reserved SRS resources from said antenna devices.

12. The method of claim 9, wherein the step of coordinating reservations further comprises:
    assigning, by a plurality of coordinator nodes, reserved SRS resources to an antenna device disposed in a macrocell area.

13. The method of claim 1, further comprising:
    coordinating assignment of uplink SRSs to UEs.

14. The method of claim 13, wherein said step of coordinating assignment of uplink SRSs further comprises:
    assigning an SRS to a UE when the UE switches from an idle state to an RRC connected state.

15. The method of claim 14, further comprising:
    determining said UE's location; and
    assigning as said SRS, an SRS which is locally unique to said UE.

16. The method of claim 15, further comprising:
    selecting, as said locally unique SRS, an SRS which is also assigned to one or more other UEs having at least a predetermined distance relative to said UE; and
    selecting an SRS transmission periodicity based on a speed of said UE.

17. The method of claim 14, wherein said UE was previously assigned said SRS upon initial connection and wherein said SRS is re-used upon switching from said idle state to said RRC connected state unless a position of said UE is changed.

18. The method of claim 13, wherein said step of coordinating assignment of uplink SRSs further comprises:
    assigning a cell global SRS which is not re-used in smaller, local antenna areas;
    activating antennas to serve said UE;
    receiving quality values from said activated antennas; and
    performing a reconfiguration based on said received quality values.

19. The method of claim 1, further comprising:
    selecting SRSs for searching by said antenna devices.

20. The method of claim 19, wherein the step of selecting SRSs for searching further comprises:
transmitting, by a coordinator node, a signal informing each of said antenna devices of said selected SRSs.

21. The method of claim 20, wherein the step of selecting SRSs for searching further comprises:
transmitting, by a coordinator node, a signal informing each of said antenna devices of a quality threshold to be used in searching for said SRSs.

22. The method of claim 21, further comprising:
receiving, by at least some of said antenna devices, one of said selected SRSs; and
transmitting, by said at least some of said antenna devices, said reports if said one of said selected SRSs is received at or above said quality threshold.

23. The method of claim 1, further comprising:
updating a list of assigned SRSs per UE and received SRS quality per antenna based upon said received reports.

24. The method of claim 1, further comprising:
informing said antenna devices of a DRX active time associated with said UE, and
receiving said reports associated with said SRS only when said SRS is received on said assigned SRS resource during said DRX active time.

25. The method of claim 24, further comprising:
determining whether said received reports are associated with reception of said SRS on said assigned SRS resource during a DRX active time of said UE; and
performing said updating based on said determining.

26. The method of claim 1, wherein the step of selecting the at least one antenna based on said one or more reports further comprises:
receiving information associated with at least one of antenna device load and antenna device capacity; and
selecting the at least one antenna based upon said reports and said information.

27. The method of claim 1, further comprising:
transmitting scheduling information associated with transmissions by said UE to one or more antenna devices associated with said selected at least one antenna.

28. The method of claim 1, further comprising:
reconfiguring said assigned SRS resource when the SRS is revoked when the UE leaves a cell associated with the assigned SRS resource or when the UE moves into proximity with another UE having the same assigned SRS resource.

29. A coordinator node configured to select at least one antenna to receive uplink transmissions from a user equipment, UE, from among a plurality of antennas comprising:
the coordinator node is configured to assign a sounding reference signal, SRS, resource to the UE,
the coordinator node is configured to receive one or more reports from antenna devices having said plurality of antennas, which reports indicate receipt of an SRS on said assigned SRS resource, wherein each of said antenna devices includes an SRS receiver with only basic PHY layer functions and further wherein said coordinator node is configured to receive in-phase (I) and quadrature (Q) samples associated with receipt of said SRS on said assigned SRS resource,
the coordinator node is configured to select the at least one antenna based on said one or more reports, and
the coordinator node is configured to coordinate reservations of said SRS resources in areas associated with said antenna devices.

30. The coordinator node of claim 29, wherein the coordinator node is a macro base station and the antenna devices are low power nodes.

31. The coordinator node of claim 29, further comprising:
said antenna devices configured to operate in a peer-to-peer mode and configured to receive, assign and select.

32. The coordinator node of claim 29, wherein said antenna devices include one or more of macro radio base stations (RBSs), pico RBSs, relays and other low power nodes.

33. The coordinator node of claim 29, wherein the at least one antenna is configured to receive said uplink transmissions from the UE.

34. The coordinator node of claim 29, wherein each of said antenna devices includes an E-UTRAN reception chain including protocol layers PHY, MAC, RLC and PDCP.

35. The coordinator node of claim 29, wherein each of said antenna devices further includes a further receiver configured to decode PUSCH/PUCCH signals.

36. The coordinator node of claim 29, wherein reserved SRS resources are not used for PUSCH or PUCCH transmissions.

37. The coordinator node of claim 29, wherein the coordinator node is configured to receive a request for reserved SRS resources from an antenna device, and configured to assign reserved SRS resources to said antenna device in response to said request.

38. The coordinator node of claim 29, wherein the coordinator node is configured to assign reserved SRS resources to said antenna devices without receiving a request for reserved SRS resources from said antenna devices.

39. The coordinator node of claim 29, wherein a plurality of coordinator nodes are configured to assign reserved SRS resources to an antenna device disposed in a macrocell area.

40. The coordinator node of claim 29, wherein the coordinator node is configured to coordinate assignment of uplink SRSs to UEs.

41. The coordinator node of claim 40, wherein the coordinator node is configured to assign an SRS to a UE when the UE switches from an idle state to an RRC connected state.

42. The coordinator node of claim 41, wherein the coordinator node is configured to determine said UE's location and configured to assign as said SRS, an SRS which is locally unique to said UE.

43. The coordinator node of claim 42, wherein the coordinator node is configured to
select, as said locally unique SRS, an SRS which is also assigned to one or more other UEs having at least a predetermined distance relative to said UE and configured to select an SRS transmission periodicity based on a speed of said UE.

44. The coordinator node of claim 42, wherein said UE was previously assigned said SRS upon initial connection and wherein said SRS is re-used upon switching from said idle state to said RRC connected state unless a position of said UE is changed.

45. The coordinator node of claim 40, wherein the coordinator node is configured to
assign a cell global SRS which is not re-used in smaller, local antenna areas, configured to activate antennas to serve said UE, configured to receive quality values from said activated antennas and configured to perform a reconfiguration based on said received quality values.

46. The coordinator node of claim 29, wherein said antenna devices are configured to select SRSs for searching.

47. The coordinator node of claim 46, wherein the coordinator node is configured to transmit a signal informing each of said antenna devices of said selected SRSs.

48. The coordinator node of claim 46, wherein the coordinator node is configured to transmit a signal informing each of said antenna devices of a quality threshold to be used in searching for said SRSs.

49. The coordinator node of claim 48, wherein at least some of said antenna devices are configured to receive one of said selected SRSs and at least some of said antenna devices are configured to transmit said reports if said one of said selected SRSs is received at or above said quality threshold.

50. The coordinator node of claim 29, wherein the coordinator node is configured to update a list of assigned SRSs per UE and received SRS quality per antenna based upon said received reports.

51. The coordinator node of claim 29, wherein the coordinator node is configured to inform said antenna devices of a DRX active time associated with said UE and configured to receive said reports associated with said SRS only when said SRS is received on said assigned SRS resource during said DRX active time.

52. The coordinator node of claim 51, wherein the coordinator node is configured to determine whether said received reports are associated with reception of said SRS on said assigned SRS resource during a DRX active time of said UE and configured to perform said updating based on said determining.

53. The coordinator node of claim 29, wherein the coordinator node is configured to receive information associated with at least one of antenna device load and antenna device capacity and configured to select the at least one antenna based upon said reports and said information.

54. The coordinator node of claim 29, wherein the coordinator node is configured to transmit scheduling information associated with transmissions by said UE to one or more antenna devices associated with said selected at least one antenna.

55. The coordinator node of claim 29, wherein the coordinator node is configured to reconfigure said assigned SRS resource when the SRS is revoked when the UE leaves a cell associated with the assigned SRS resource or when the UE moves into proximity with another UE having the same assigned SRS resource.

* * * * *

UNITED STATES PATENT AND TRADEMARK OFFICE
CERTIFICATE OF CORRECTION

| | | |
|---|---|---|
| PATENT NO. | : 8,634,868 B2 | |
| APPLICATION NO. | : 13/132467 | |
| DATED | : January 21, 2014 | |
| INVENTOR(S) | : Hedberg et al. | |

It is certified that error appears in the above-identified patent and that said Letters Patent is hereby corrected as shown below:

In the Specification

In Column 12, Line 23, delete "'RC Connection" and insert -- 'RRC Connection --, therefor.

Signed and Sealed this
Second Day of September, 2014

Michelle K. Lee
*Deputy Director of the United States Patent and Trademark Office*